(12) United States Patent
Aagesen et al.

(10) Patent No.: US 7,892,321 B2
(45) Date of Patent: Feb. 22, 2011

(54) INTEGRATED HEATED PREVAPORATION MODULE

(75) Inventors: Diane Lee Aagesen, Signal Hill, CA (US); Kandaswamy Duraiswamy, Huntington Beach, CA (US)

(73) Assignee: Intelligent Energy, Inc., Long Beach, CA (US)

( * ) Notice: Subject to any disclaimer, the term of this patent is extended or adjusted under 35 U.S.C. 154(b) by 318 days.

(21) Appl. No.: 12/106,834

(22) Filed: Apr. 21, 2008

(65) Prior Publication Data

US 2008/0308496 A1    Dec. 18, 2008

(51) Int. Cl.
*B01D 53/22* (2006.01)

(52) U.S. Cl. .................. 95/45; 95/14; 95/18; 95/46; 95/54; 95/250; 95/251; 96/4; 96/6; 96/7; 96/11; 96/173; 96/201; 96/218; 96/420; 210/640; 210/641

(58) Field of Classification Search .............. 96/4, 96/6, 7, 11, 173, 193, 201, 218, 420; 95/14, 95/18, 45, 46, 54, 250, 251; 210/640, 641, 210/650
See application file for complete search history.

(56) References Cited

U.S. PATENT DOCUMENTS

| | | | | |
|---|---|---|---|---|
| 4,879,041 A | * | 11/1989 | Kurokawa et al. | 210/640 |
| 4,961,082 A | * | 10/1990 | Hoisington et al. | 95/46 |
| 4,985,054 A | * | 1/1991 | Shibata et al. | 96/6 |
| 5,053,060 A | * | 10/1991 | Kopf-Sill et al. | 95/46 |
| 5,154,832 A | * | 10/1992 | Yamamura et al. | 210/640 |
| 5,183,486 A | * | 2/1993 | Gatten et al. | 96/6 |
| 7,314,565 B2 | * | 1/2008 | Sabottke et al. | 210/640 |
| 7,384,452 B2 | * | 6/2008 | Sirman et al. | 95/54 |
| 7,442,344 B2 | * | 10/2008 | Suzuki et al. | 95/54 |
| 7,459,084 B2 | * | 12/2008 | Baig et al. | 210/640 |
| 7,700,213 B2 | * | 4/2010 | Luo et al. | 96/6 |
| 2005/0269266 A1 | * | 12/2005 | Twardowski et al. | 210/640 |
| 2006/0113248 A1 | * | 6/2006 | Koenig et al. | 210/640 |

* cited by examiner

*Primary Examiner*—Jason M Greene
(74) *Attorney, Agent, or Firm*—Mark Krietzman

(57) ABSTRACT

An integrated heating system for adding heat to a feed fuel within a module by way of an integrated heating element within the body or casing of the module. The heat may be selectively added to maintain a selected temperature.

14 Claims, 13 Drawing Sheets

US 7,892,321 B2

INTEGRATED HEATED PREVAPORATION MODULE

RELATED APPLICATION

This application incorporates by reference herein in its entirety U.S. application Ser. No. 11/345,980 titled "Multi-Stage Sulfur Removal System and Process for an Auxiliary Fuel System", filed Feb. 1, 2006.

BACKGROUND OF THE DISCLOSURE

1. Field of Endeavor

This disclosure relates generally to fuel systems and more particularly to a system and process for extraction of an auxiliary fuel stream with low concentrations of sulfur compounds from a primary fuel stream having higher concentrations of sulfur compounds including an internally heated module.

2. Description of Related Art

Continuing improvements in the performance, cost and durability of fuel cell systems have continued to raise interest in their use as auxiliary power units (APU), for example, in a vehicle such as a hybrid or fuel cell powered automobile. One limitation to their practical application involves the logistic fuels or conventional fuels used, for example, diesel and kerosene cuts. These fuels have sulfur content in the range of 30 to 3,000 ppm, which either impacts the conversion of these fuels to hydrogen or the synthetic gas stream, or impacts the performance of the fuel cell downstream. One alternative is to require a synthetic "no sulfur" type liquid fuel such as Fischer-Tropsch liquid or gas-to-liquid products for the APU, but this forces the need for two separate fuel streams to be provided for the same vehicle.

Some governmental agencies of the United States for example, have mandated lower levels of sulfur in fuels such as the recent push toward 30 to 300 ppm. Even with levels near the lowest limit, the sulfur content affects the performance of catalysts in down stream processes, and therefore, preventing effective use of fuel cell systems. Technologies, including membrane based technologies, are being developed for refinery scale applications to achieve these lower sulfur specifications. Membrane technologies and specifically prevaporation membrane technology are commercial technologies that are practiced in a number of industries for the separation of higher vapor pressure components from a mixture of liquid stream.

Typical prevaporation assemblies operate from about 90° to about 130° C. and permeate flux generally increases with increasing temperature (heat causes membrane swelling. A vaporizes permeate, upon entering a vacuum space within an assembly, losses heat needed for phase to the leaf (or layered) material of the assembly, as the vapor passes through the length of the assembly. Once the feed solution has cooled significantly, the membrane generally contracts thereby becoming resistant to diffusion which reduces the membrane module fractionation efficiency/capacity.

U.S. Pat. No. 5,445,731 describes reheating retentate external to the apparatus before reintroducing it into a second membrane module.

Plate and frame designs heating elements are described in U.S. Pat. No. 4,650,574 to provide heating within a membrane assemblies which have thermal resistance between the heating media and the feed solution.

It would be desirable to have a simple process that provides the needed separation selectivity, that could be implemented in a compact, inexpensive system and that would operate with a wide range of primary fuels from gasoline, kerosene, jet fuel and diesel or water-soluble mixtures. It is to these needs that the present disclosure is directed.

SUMMARY OF THE DISCLOSURE

Embodiments of a system and process for producing an auxiliary fuel stream containing low concentration of sulfur compounds from a primary fuel stream according to an exemplary implementation are disclosed. The system includes a first separation stage that isolates a stage-one permeate stream and a stage-one retentate stream from a portion of the primary fuel stream. A second separation stage isolates a stage-two permeate stream and a stage-two retentate stream from the stage-one permeate stream in which the stage-two retentate stream includes an auxiliary fuel stream containing low concentrations of sulfur compounds. The stage-one retentate stream and the stage-two permeate stream are mixed and returned into the primary fuel stream. The result is an auxiliary fuel stream containing low concentration of sulfur compounds along with the primary fuel stream.

According to a further exemplary implementation, a process for separating an auxiliary fuel stream containing low sulfur compounds from a primary fuel stream includes: isolating a stage-one permeate stream and a stage-one retentate stream from the primary fuel stream; evaporating the stage-one permeate stream at a vacuum; isolating a stage-two permeate stream and a stage-two retentate stream from the stage-one permeate stream, the stage-two retentate stream comprising a fuel stream containing low concentrations of sulfur compounds; and evaporating the stage-two permeate stream at a vacuum for return of the stage-two permeate stream to the primary fuel stream. The stage-two retentate stream is therefore the auxiliary fuel stream containing low sulfur compounds.

According to an additional exemplary implementation, a system for separating a fuel stream containing low concentrations of sulfur compounds from a primary fuel stream includes: a fuel supply; a stage-one separator; a stage-two separator; a first supply line connecting the fuel supply to the stage-one separator; a second supply line connecting the stage-one separator and the stage-two separator. The first supply line conveys a fuel stream from the fuel supply to the stage-one separator. The stage-one separator produces a stage-one permeate stream and a stage-one retentate stream from the stage-one fuel supply stream. The second supply line conveys the stage-one permeate stream from the stage-one separator, to the stage-two separator. The stage-two separator produces a stage-two permeate stream and a stage-two retentate stream. The stage-two retentate stream produced is fuel stream containing low concentrations of sulfur compounds. In this system, the stage-one retentate stream and stage-two permeate are then mixed and returned to the primary fuel stream.

According to still further exemplary implementation, a system for separating a fuel stream containing low concentration of sulfur compounds from a primary fuel stream is disclosed that includes: a stage-one separator providing a gaseous stage-one permeate stream and a stage-one retentate stream from a primary fuel stream; a first eductor associated with the stage-one separator, the eductor providing a vacuum and cooling energy to condense the stage-one permeate vapor using the cooled stage-one permeate liquid as the motive fluid for the first eductor; and a stage-two separator providing a stage-two retentate stream and a gaseous stage-two permeate stream from the condensed stage-one permeate stream, the stage-two retentate stream comprising fuel stream containing low concentration of sulfur compounds; and a second eductor associated with the stage-two separator, the eductor using the cooled stage-one retentate as the motive fluid to provide a vacuum for stage-two permeate vapor and condense and mix the stage-two permeate vapor with the stage-one retentate. The vacuum produced may not only be generated by the use of eductors with process liquid as motive fluid. Compressed gases such as air, steam or $N_2$ enriched air may be used as the motive fluid. Alternatively, a motor-driven vacuum pump may be utilized to generate the vacuum.

According to an additional exemplary implementation, a system for separating a fuel stream containing low concentrations of sulfur compounds from a primary fuel stream includes: a fuel supply; a stage-one separator; a reactive de-sulfurization catalyst; a sorbent bed downstream of the catalyst; a first supply line connecting the fuel supply to the stage-one separator; a first vapor phase supply line connecting the stage-one separator to the reactive de-sulfurization catalyst; a first sorbent bed feed line; a first condensed supply line; and a first reactant supply line. The first supply line conveys a fuel stream from the fuel supply to the stage-one separator. The stage-one separator produces a stage-one permeate stream and a stage-one retentate stream from the stage-one fuel supply stream. The first vapor phase supply line conveys the stage-one permeate stream from the stage-one separator, to the reactive de-sulfurization catalyst. The reactant supply line supplies reactant to the reactive de-sulfurization catalyst. The catalyst supports the chemical reaction of the sulfur species in the stage one permeate with the reactant to modify the sulfur species. The first sorbent bed feed lines connects the reactant catalyst with the sorbent bed. The modified sulfur species adsorb or absorb to the sorbent and the remaining stage one permeate is condensed for later use or processing.

In one exemplary implementation membrane module inefficiency is addressed by placing a compensating heat element precisely where it is needed in direct contact with the feed inside the layered or "leaf" arrangement wherein a hot fuel feed stream is separated into permeate and retentate. The layers may be used to form a chamber or channel through which the hot fuel is fed. The membrane module's internal temperature is impacted by the heat element to replace some of the loss of heat from the vaporized feed fuel as it travels over the entire length of the module.

In one aspect the vaporized feed fuel need not be reheated to the same degree, or at all, before passing through a module because the internal heating strategy within the module compensates for at least of portion of heat losses attributable to the passing of the vaporized feed fuel through a membrane module, such as a prevaporation module. Those of ordinary skill in the art will recognize that this strategy may be applied to a variety of different modules wherein maintaining a temperature state is important.

In some exemplary implementations the module is tubular and the leaf arrangement is spiral or wound. In other exemplary implementations the layered arrangement may be planar such as in a plate and frame assembly wherein the feed fuel passes through a chamber or channel.

The source of energy to the module may be provided by an electric heating blanket sealed within the module's feed channels.

The source of energy to the module may be provided by a thin hollow foil wrapping, and or sealed within the module's feed spacing through which a heat-exchange fluid can provide the heat necessary for vaporization.

The source of energy to the heat element may be provided by a solid metal foil wrapping, and or sealed within a module to control the introduction of RF (radiofrequency) energy used to heat the foil by wrapping an induction coil around the module assembly. Through this coil, an AC current would induce a magnetic field thereby heating the foils within the leaf space. Additionally the induction element can be placed inside the module's core tube to induce the magnetic field from within the spiral wrappings.

The source of energy to the heat element may be provided by an inductively driven electrical conduit using either electricity or radio frequency.

To note one example of the latent heat requirement for PV systems in hydrocarbon fuel processing, the compensating element should be able to provide approximately 240 W per square meter of membrane (based on a flux rate of 2.5 kg/hrm$^2$). Without this additional heat to compensate for phase change, almost half of the enthalpy of the incoming feed will be lost and subsequently cool by roughly 30° C. Such a drastic temperature drop would force put most PV membrane materials below their minimum operating temperature resulting in little or no permeation whatsoever.

Many PV applications require larger fractions of raw feed material than can be achieved with the existing single module technology. The invention provides an energy effective solution to this problem.

The features and aspects of the present disclosure will be better understood from the following detailed descriptions, taken in conjunction with the accompanying drawings, all of which are given by illustration only, and are not limitative of the present disclosure.

BRIEF DESCRIPTION OF DRAWINGS

The above-mentioned features and objects of the present disclosure will become more apparent with reference to the following description taken in conjunction with the accompanying drawings wherein like reference numerals denote like elements and in which.

DEFINITIONS

Figure 1:
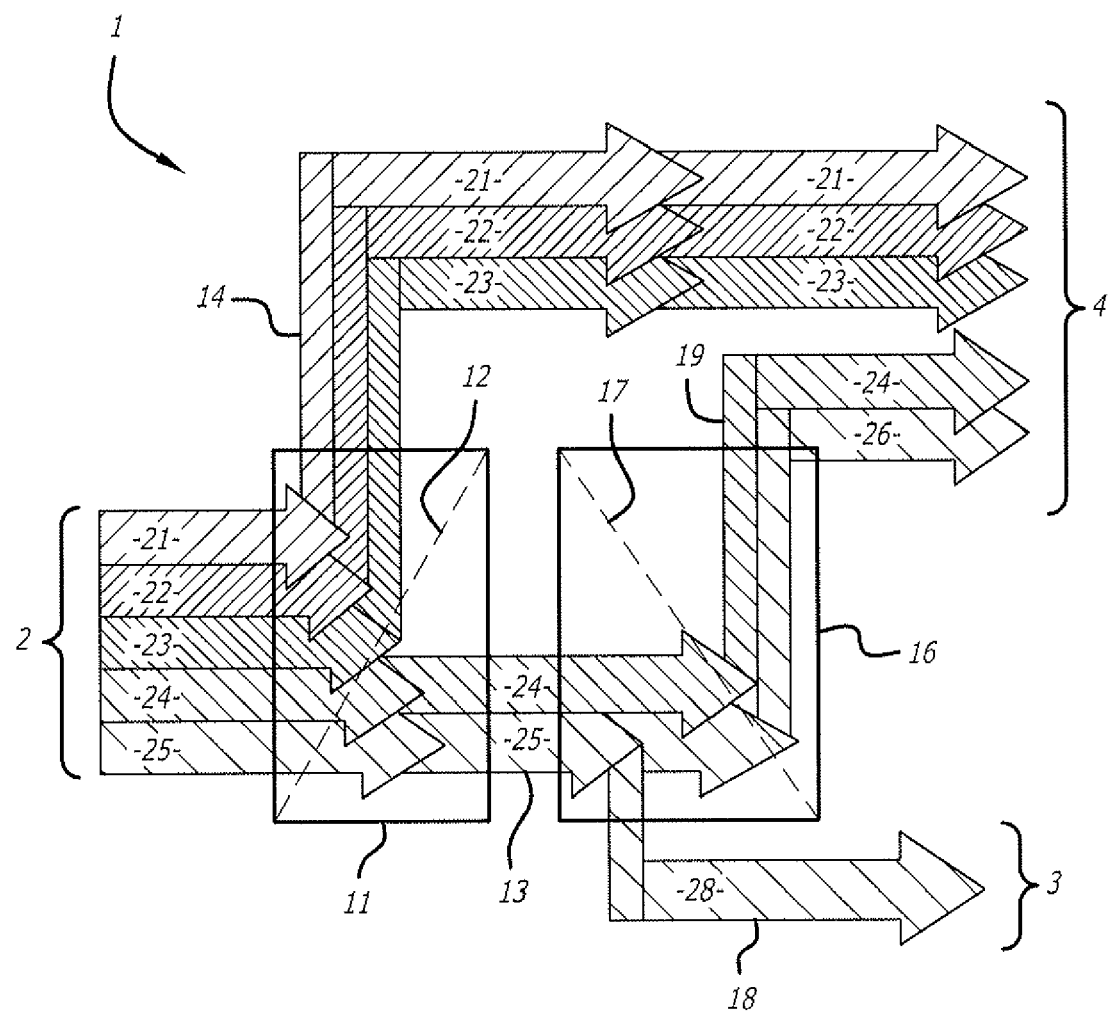
FIG. 1 is a conceptual diagram of an exemplary embodiment of the process in accordance with the present disclosure.

In the discussion that follows, the terms used are used according to their plain meaning as intended by a person skilled in the art. In the described embodiments below, the terms below are intended to be used as follows.

The term "hydrocarbon" is generally used to describe an organic compound primarily composed of hydrogen and carbon atoms of various lengths and structures but may also contain non-carbon atoms (such as oxygen, sulfur, or nitrogen).

The term "straight chain hydrocarbon" implies that the compound is a paraffin or isoparaffin type hydrocarbon without ring structures.

The term "prevaporation" means separation of mixtures of liquids by partial vaporation through a non-porous membrane.

The term "naphthenes or naphthenic compounds" are hydrocarbons with one or more rings of carbon atoms with only single bonds.

The term "aromatic compound" is an hydrocarbon containing one or more rings of carbon with double bonds within these rings.

The term "heterocyclics" are aromatic or naphthenic compounds that contain atoms in addition to carbon and hydrogen such as sulfur, nitrogen or oxygen. Heterocyclics are usually polar in nature.

The terms "polar" or "ionic", as referred to membranes, indicate membranes that contain ionic bonds. Similarly, the terms "non-polar" or "non-ionic" are membranes that do not contain ionic bonds. If the membrane is polar in nature or coated with a polar material such as a fluorinated polymer with branched sulfonic acid groups, e.g., Nafion®, the compounds with polar species will tend to be selectively transferred through the membrane. Non-polar membranes, such as cellulose triacetate, will tend to be selective to non-polar compounds and selectively decrease the transfer rate of ionic compounds.

DETAILED DESCRIPTION OF THE EMBODIMENTS

The present disclosure relates to a prevaporation membrane process and system for separating a slip stream or auxiliary fuel stream from a primary fuel stream.

It should be appreciated that for simplicity and clarity of illustration, elements shown in the Figures and discussed below have not necessarily been drawn to scale. For example, the dimensions of some of the elements are exaggerated relative to each other for clarity. Further, where considered appropriate, reference numerals have been repeated among the Figures to indicate corresponding elements.

FIG. 1 shows a simplified schematic representation of the overall process according to this disclosure, indicating two separation stages and the selectivity for the various elements of the fuel feed mixture. The process 1 comprises flowing a portion of a primary fuel stream 2 through a stage-one separator 11 and then flowing a separated portion through a stage-two separator 16. The primary fuel 2 can be any commercially available transportation or logistics fuel (such as, but not limited to, reformulated gasoline, kerosene and diesel commonly available at interstate refueling stations, jet fuels, aviation kerosene's (A-1) or military specification fuels like JP-8, NATO F-76, etc.) These fuels consist of a wide mix of hydrocarbon components, which typically have been separated from a bulk fuel source through a vapor fractionation process during refining. As a result, each mixture has a range of compounds that each vaporize over a defined temperature band. In general, gasoline contains lighter components than kerosene, which in turn is lighter than diesel fuels. Within each volume of fuel of a specific type there exists a range of compounds with various vapor pressures and polar and non-polar characteristics.

The primary fuel feed 2 is in particular composed of a mixture of components that can, in particular, consist of a mixture of hydrocarbons that can be subdivided into five primary groupings. The first group is the heavy sulfur compounds (H Sulfur) 22 which are the multi-ringed and multi-branched hydrocarbons with relatively high boiling points. For example, these include the di-benzothiophenes with boiling points greater than 300° C. The di-benzothiophenes contain at least a three ring structures and are aromatic compounds. The second group is the light sulfur compounds (L Sulfur) 24, which are the simpler compounds containing sulfur with relatively lower boiling points and less than three ring structures. For example these include the various as mercaptans, thiophenes, and benzo-thiophenes with boiling points less than 300° C., and more preferably below 225° C. The third group is the heavy hydrocarbons (H HC) 21, and the fourth is the light hydrocarbons (L HC) 25, neither of which contain sulfur atoms which were included in the first two groups. The fifth group is the additives 23, which are specific to each type of fuel depending on the manufacture, the manufacturer, and other criteria. For example, military JP-8 fuel is similar to commercial aviation fuel except that three additives are required in the specification. For JP-8 these are fuel system icing inhibitors (MIL-DTL-85470) di-ethylene glycol monomethlyiether (di-EGME), corrosion inhibitor/lubricity improvers (MIL-PRF-25017 and Paradyne 655) and electrical conductivity/static dissipater (Stadis®450 and MIL-S-53021). These specifications are set forth in the "GUIDE FOR FIELD BLENDING OF ADDITIVES OR FOR WINTERIZING GROUND FUELS", AMSTA-TR-D/210, U.S. Army Tank-Automotive Research, Development and Engineering Center (TARDEC), Warren, M48397-5000, October 1999, incorporated herein by reference in its entirety.

In the process 1 shown in FIG. 1, primary fuel feed 2 is separated into an auxiliary fuel stream 3 and a return primary fuel stream 4 in a multi-stage process 1 consisting of a stage-one separation process 11 and a stage-two separation process 16. The stage-one separation process 11 supports the transfer through a membrane 12 of the lighter compounds consisting of light sulfurs 24 and light hydrocarbons 25, which exit as the stage-one permeate 13. The other compounds 21, 22, and 23 are retained in the retentate stream 14 also resulting from the stage-one separation process 11. The stage-one permeate 13 is passed to the stage-two separation process 16. In the stage-two-separation process light sulfur compounds 24 are selectively transferred through membrane 17 along with some of the light compounds 26 as the stage-two permeate 19 while most of the lighter hydrocarbons 28 are retained in the stage-two retentate stream 18. The stage-two permeate 19 is mixed with the stage-one retentate 14 and returned to the primary application or tank as the return primary fuel stream 4. The stage-two retentate 18 becomes the auxiliary fuel supply 3.

Although the stage-one 11 and the stage-two 16 processes are selective processes, their selectivity is not necessarily absolute. By controlling the temperature of the feed streams 2 and 13 and the vacuum of the permeate streams 13 and 19, the quantity of compounds actually transferred through the membranes 12 and 17 can be controlled.

The motive force for permeation is the partial pressure difference (PPD) of the compounds passing through the membranes in each stage. The permeation rate is enhanced as the temperature increases. Temperature limitation of the membrane materials may suggest a lower operating point, but applying vacuum in the permeate side would give higher PPD motive force to compensate for the lower temperature. As the temperature of the feed stream is increased, the mobility of the compounds is increased and permeability of the membrane is increased. Both parameters increase the rate of transfer of compounds through the membrane. The temperature of the membrane also increases the vapor pressure of compounds exposed to the permeate side of the membrane.

In a process 1 using prevaporation membranes, a vacuum in a range of 1 to 500 torr, and more preferably between 100 torr to about 200 torr, may be applied to the permeate side and the compounds with the highest vapor pressure are evaporated from the surface of the membrane as a vapor. The optimal temperature range depends on the level of vacuum, the type of primary fuel, and the membrane material that is utilized. For example, where the primary fuel is an aviation kerosene and the light hydrocarbon cut from the stage-one process 11 is in the gasoline boiling range, and a vacuum is applied across the membrane, then the temperature range should be between about 100° C. and about 200° C., with a preferable range between about 120° C. to 135° C. when a vacuum of 100-200 torr is applied. If, on the other hand, the primary fuel is a diesel cut, then the temperature may be in the 150° C. to 300° C. range. The evaporation of the compounds with the highest vapor pressure creates a concentration gradient across the membrane, which promotes the enhanced transfer of these compounds from the feed stream. Compounds with low vapor pressures do not evaporate and therefore, a concentration gradient is not established for these compounds and additional transfers do not occur. Other parameters such as the membrane surface area, membrane thickness, and internal fluid phase mixing on the retentate side of the membrane also contribute to the quantity of compounds transferred. Increases in membrane surface area provide enhanced transfer because of the larger area for transfer and the larger evaporative transfer area on the permeate side. Thinner membranes have lower resistance for transport and support higher transfer rates because the concentration gradient that is established functions over a shorter distance.

The permeate flux is inversely proportional to the membrane thickness and hence a thinner membrane is preferred if it can survive at the operating pressure and temperature. Internal fluid phase mixing enhances transfer rates by ensuring mixing of the various compounds in the feed stream and maintaining the highest concentration of high vapor pressure compounds possible at the feed surface of the membrane. The mass transfer resistance in the bulk flow on the retentate side may reduce the effective partial pressure at the membrane surface. Turbulent flow or high flow velocities can improve mixing and increase flux. Adjusting these characteristics of the membranes in stage-one separators and stage-two separators help ensure that all of the light sulfur compounds 24 which are transferred in stage one 11 are again transferred in stage two 16. By operating at low enough temperatures where higher boiling compounds do not vaporize, the amount of heavy aromatics or multi-ring sulfur compounds such as the di-benzothiophenes going through into the permeate can be reduced and minimized.

The stage-one separation process 11 and stage-two separation process 16 in accordance with the present disclosure can be carried out utilizing a number of techniques ranging from flash vaporization separation (FVS), use of filtration membranes such as reverse osmosis (ROM), nano-filtration membranes (NFM) and ultra-filtration membranes (UFM) to prevaporation membranes such as non-polar prevaporation membranes (NPVM) and polar prevaporation membranes (PPVM). Proper selection of the specific separation technique for each stage is dependent on the specific primary fuel and the distribution of sulfur compounds within the mixture. The specific additives 23 and sulfur compounds in the primary fuel feed 2 can also influence the selection of which separation technique is optimum.

The separation techniques suitable in the separation processes herein disclosed, and their selectivity with respect to the compounds of interest in all embodiments of this process can be identified by consideration of three characteristics. The first is physical size of the pores, the second is selectivity by polar or ionic characteristic of the compounds such as sulfur compounds, and the third is selectivity by boiling point or vapor pressure. One exemplary embodiment of the present disclosure involves a first step of separating a low boiling fraction permeate for processing through a sulfur-selective membrane in a second step and collecting the light retentate as the clean product for down stream processes such as an auxiliary fuel source. The high boiling fraction retentate from the first step and the permeate from the second step are combined and sent back as the residual fuel.

Simple filtration processes such as ROM, NFM and UFM provide separation primarily by physical size and structure. ROM separation devices have effective pores sizes below 0.0014 micrometers, while NFM devices have pores from 0.0008 and 0.005 micrometers and UFM devices have pores from 0.0025 to 0.1 micrometers. These relate to compound selectivity by molecular weight to some degree. For example ROM is good for compounds below 300 gm/mole, NFM is good for between 160 to 10,000 gm/mole and UFM is good for between 2,000 and 200,000 gm/mole. In addition to mass, the three-dimensional shape of the molecules also impacts selectivity with complex multi-ring structures having greater steric hindrances than linear straight chain compounds.

Separation technologies such as flash vaporizers and prevaporation membranes are selective to the boiling point, or vapor pressure, of the compounds. For example, in a flash vaporizer, a liquid feed is pressurized and heated. This heated and pressurized fluid is then passed through an orifice creating a rapid pressure reduction and evaporation of some of the low boiling point compounds within the mixture takes place. Heavier compounds with higher boiling points remain as a liquid. Thus the fuel feed will then be a two phase mixture. This two phase (gas-liquid) mixture is then separated into a gas stream and a liquid stream. The gas stream is then condensed to complete the separation process. Utilization of a prevaporation membrane is similar, except, it combines the separation processes of membranes and vaporization.

In one embodiment of a system in accordance with the present disclosure, a flash vaporizer equipped with a fractional distillation unit is used as the first stage, and polar prevaporation membrane is used in the second separation stage. In another embodiment, polar prevaporation membranes are used to perform both the first and second stage separations. These PPVMs combine the physical filtration and polar selectivity to preferentially isolate polar compounds of small size, and then apply additional selectivity because the transferred compounds that are vaporized from the permeate side of the membrane. If a compound physically can transfer through the membrane, but its vapor pressure is too low at the operating temperature to be vaporized, it will not be carried over to the permeate phase. Therefore, a PPVM separator operating at a defined temperature can demonstrate selectivity to both light hydrocarbons and light sulfur compounds.

In another embodiment of the system in accordance with the present disclosure, the stage-two separator has a greater selectivity to polar molecules than the stage-one separator. This characteristic helps ensure that all polar sulfur compounds and other ionic compounds, which transfer through the first membrane, are returned to the primary fuel by way of the second stage permeate flow.

An exemplary embodiment of the process is designed to provide a low-sulfur, clean fuel stream usable in an auxiliary power unit (APU) onboard a vehicle by extracting a fraction of the fuel being sent to the primary application, such as to drive the engine or primary generator. An important parameter in the evaluation of the efficiency of the process is the ability to extract a low sulfur fraction of the fuel mixture while leaving behind substantially all of the fuel's performance additives and sulfur compounds in the return primary fuel stream.

Figure 2:
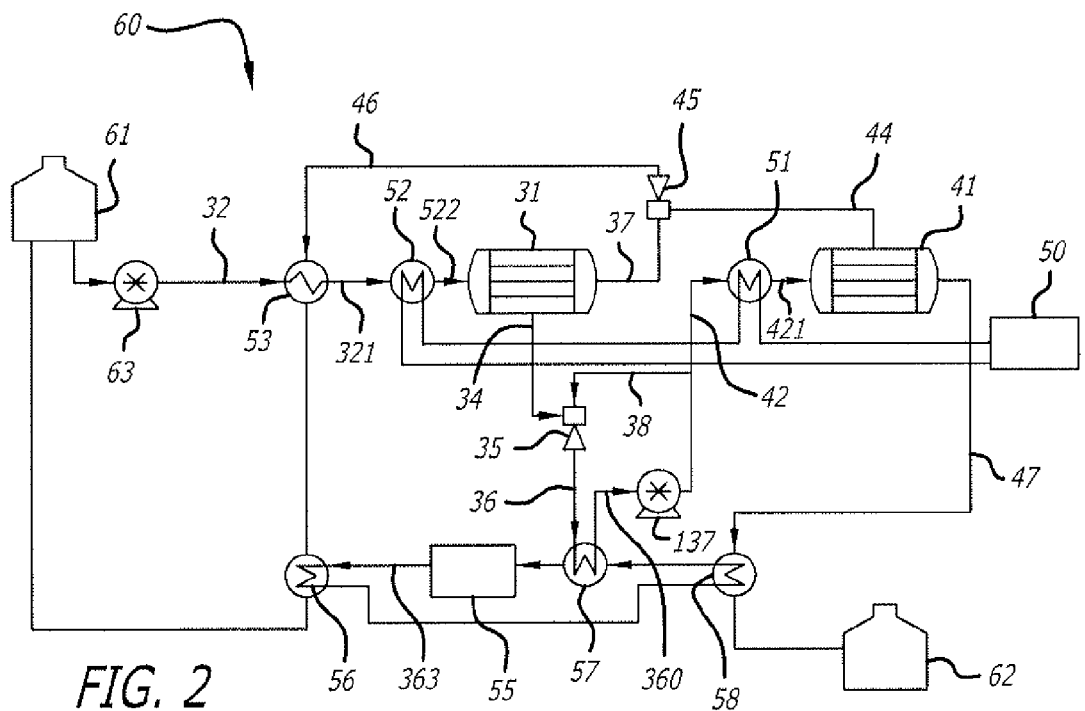
FIG. 2 is a simplified schematic flow diagram of an embodiment of the system in accordance with the present disclosure.

FIG. 2 shows an embodiment of the process 1 of FIG. 1 implemented in a system 60. In the system 60 primary fuel from the tank 61 is pressurized by pump 63 in a primary fuel feed stream 32. The primary fuel feed stream 32 is then heated by the process recuperative heat exchanger 53 to a primary fuel first hot feed stream 321. The primary fuel first hot feed stream 321 is then heated by the hot engine fluid 50 in the heat exchanger 52 to a primary fuel second hot feed stream 322. This second hot feed stream 322 is then fed to the stage-one separator 31 in which it is separated into the stage-one retentate stream 37 and stage-one permeate stream 34. The stage-one permeate stream 34 is then conveyed into eductor 35 which is driven by the eductor's motive fluid 38. In the eductor 35, the stage-one permeate vapor stream 34 is put at vacuum, where the vacuum is due to the feed stream of eductor motive fluid 38. Exiting the eductor 35 is the combined liquid stream 36, which is a mixture of the stage-one permeate stream 34 and the eductor motive fluid 38. This combined liquid stream 36 flows to cooling heat exchanger 57 where it is cooled. The weight ratio of cool motive liquid 38 to stage-one permeate vapor 34 is kept suitably high such that the condensation heat raises the temperature of the combined liquid stream 36 only slightly. The condensation of vapor into liquid results in lower volume and thus a vacuum is created upstream. The use of an eductor with high velocity motive fluid also creates vacuum.

The hot liquid stream 36 is cooled in heat exchanger 57 into a cool liquid stream 360 which is increased in pressure by pump 137 and splits into motive stream 38 sent to eductor 35 and stage-two feed stream 42. Cooling unit 55 is a heat rejection element consisting of an air cooled or liquid cooled radiator or other appropriate mechanism such as the vehicle's air conditioning system through which excess heat can be removed form the system. Cooling fluid streams 362 and 363 are cooling loops conceptually illustrated to transfer heat from the three cooling heat exchangers 56, 57, and 58 to the cooling unit 55. Although a series flow configuration is shown in the disclosure, it is not limited by this illustration and any combinations of series or parallel flows and integrated or dedicated cooling units are feasible and covered in this disclosure. Recuperative heat exchanger 53 transfers the heat from return fuel stream 46 to feed stream 32. To ensure that all the vapor in return stream 46 is condensed cooling heat exchanger 56 is included.

A portion of the liquid stream 361 is passed onto the stage-two separator 41, as stage-two feed flow 42. In the embodiment shown in FIG. 2, only a small part of the liquid stream 361 is passed onto the stage-two separator 41, while the most part flows to the eductor as eductor motive fluid 38. The use of liquid stream 361 as eductor motive fluid 38 eliminates the necessity of using a separate working fluid with its gas-liquid separators and dual downstream cooling heat exchangers. In steady state operations, the composition of the gas-liquid stream 36 is primarily the light hydrocarbon and light sulfur compounds as discussed more in details below. In steady-state operation the composition of fluids 34, 36, 38 and 361 are the same that support the direct condensation of gas-liquid stream 36 after it exits the eductor 35.

The stage-two feed 42 is passed to re-heat heat exchanger 51 and becomes a hot stage-two feed 421 that enters stage-two separator 41. The feed stream of the hot stage-two feed 421 is separated into a stage-two permeate stream 44 and a stage-two retentate stream 47. The stage-two feed 42 may, in some alternative embodiments, first be heated through recuperative heat exchangers (not shown) interfaced with the outlet streams from stage two, either stage-two permeate 44 or stage-two retentate 47 prior to entering re-heat exchanger 51. The sulfur selectivity of the membrane in stage-two separator 41 supports the transfer of a majority of the sulfur compounds in the stage-two permeate stream 44 while maintaining some of the light hydrocarbon compounds as the stage-two retentate stream 47 which is cooled and stored in tank 62 as the auxiliary fuel supply. The better the selectivity of the stage-two membrane the more light hydrocarbons are retained in the retentate stream 47. The stage-two permeate stream 44 is put at a vacuum due to the action of a motive fluid conveyed into an eductor 45. In this embodiment, the motive fluid for eductor 45 is the stage-one retentate stream 37. In another alternative, stage-two feed 42 can be heated with one or more regenerative heat exchangers interfacing with the stage-one retentate stream 37.

Use of the stage-one retentate stream 37 to drive the eductor 45 minimizes the complexity of the process. Exiting from the eductor 45 is the returning fluid 46 passing through the recuperative heat exchanger 53 to improve process thermal efficiency. The fluid is finally passed through cooling heat exchanger 56 before returning to the tank 61 to ensure the returning fluid is at or near ambient temperature.

One or both of the permeate streams may also be cooled in one or more separate cooling heat exchangers to enhance vacuum creation. In other embodiments, the stage-one retentate stream 37 is cooled prior to functioning as the motive fluid for eductor 45. For example the eductor 45 can be positioned downstream of recuperative heat exchanger 53 such that retentate stream 37 flows through heat exchanger 53 prior to entering eductor 45 as the motive fluid. In this embodiment, the motive fluid for eductor 45 is the stage-one cooled retentate stream 37. In another embodiment, one or both of the permeate streams are also cooled in one or more separate cooling heat exchangers to enhance vacuum creation.

In other embodiments, exiting from the eductor 45, the sulfur compounds transferred as permeate in the stage-two separator can be mixed with the retentate from stage one and returned to the primary engine or the primary fuel tank 61.

The system disclosed above can be used to perform a multi-stage separation process on board a vehicle to extract a low sulfur slip stream, in the stage-two retentate 47 of fuel compounds which can be used for auxiliary power units, while designing the separation stages such that performance enhancing additives in the primary fuel 32 are retained in the stage-one retentate 37 or returned to the stage-one retentate by way of the stage-two permeate 44. In prior art and conventional approaches a slip stream of the primary fuel is removed as the auxiliary fuel stream and then treated to completely destroy, adsorb or absorb the sulfur compounds.

This approach allows the extraction of a low-sulfur, clean fuel stream by way of a multi-stage process returning the sulfur compounds in the residue to the primary fuel instead of adsorbing or absorbing them on to a throw away filter or a bed of solids and destroying the sulfur compounds in the regeneration cycle. This approach also enhances the performance of third stage adsorbents or absorbents, because the other polar compounds in the fuel are also reduced in concentration by the first two stages. Adsorbent storage capacity with the most commonly used fuels was found to be one-tenth their capacity in comparison to surrogate fuels which have been doped with specific sulfur compounds. This drop in capacity is due to other compounds such as additives or heavy aromatics, which are also polar in nature occupying active sites for adsorption.

One embodiment of the system focuses on using the retentate from stage one 37 as the motive fluid for the stage-two eductor 45 that provides the vacuum on the stage-two permeate side. This retentate stream can be cooled to enhance the performance of the eductor creating greater vacuum on the stage-two permeate side. Similarly, the evaporated permeate stream 44 can also be cooled and condensed prior to entering the eductor 45 to further enhance performance. Also the stage-one retentate 37 can be cooled prior to entering the eductor to further enhance vacuum performance. Cooling of these fluids around the eductor can be through direct cooling or recuperative cooling in combination with preheating feed streams to the stage-one or stage-two membrane processes.

One embodiment of the system focuses on using the stage-one permeate stream 34 after condensation and pressurization as the motive fluid 38 for the stage-one eductor 35.

One embodiment of the system focuses on the returning fluid 46 passing through the recuperative heat exchanger 53 to improve process thermal efficiency. The fluid is then finally passed through cooling heat exchanger 56 before returning to the tank 61 to ensure the returning fluid is at or near ambient temperature.

One embodiment of the system includes the use of the thermal energy from the primary engine application to provide the peak thermal energy need for effective operation of the stage-one and stage-two separator modules. This is illustrated in FIG. 2 with engine 50 and heat exchangers 52 and 53.

Another embodiment of the system process includes further integration with the primary vehicle. In this embodiment the cooling loop source 55 is integrated with the vehicle's cabin air conditioning system to minimize component redundancy. Depending on the primary fuel type (such as JP-8, diesel, or gasoline) the vapor pressure of the light compounds in stream 34 and the pressure of the mixed stream 36 the temperature needed to fully condense the mixed stream 36 into liquid stream 361 may be less than ambient temperatures. In this situation the cooling loop element 55 may be integrated into the vehicle's air conditioning loop which has been designed to cool the cabin air. Alternatively, a dedicated cooling unit capable of sub-ambient temperatures may be used as cooling element 55.

Figure 3:
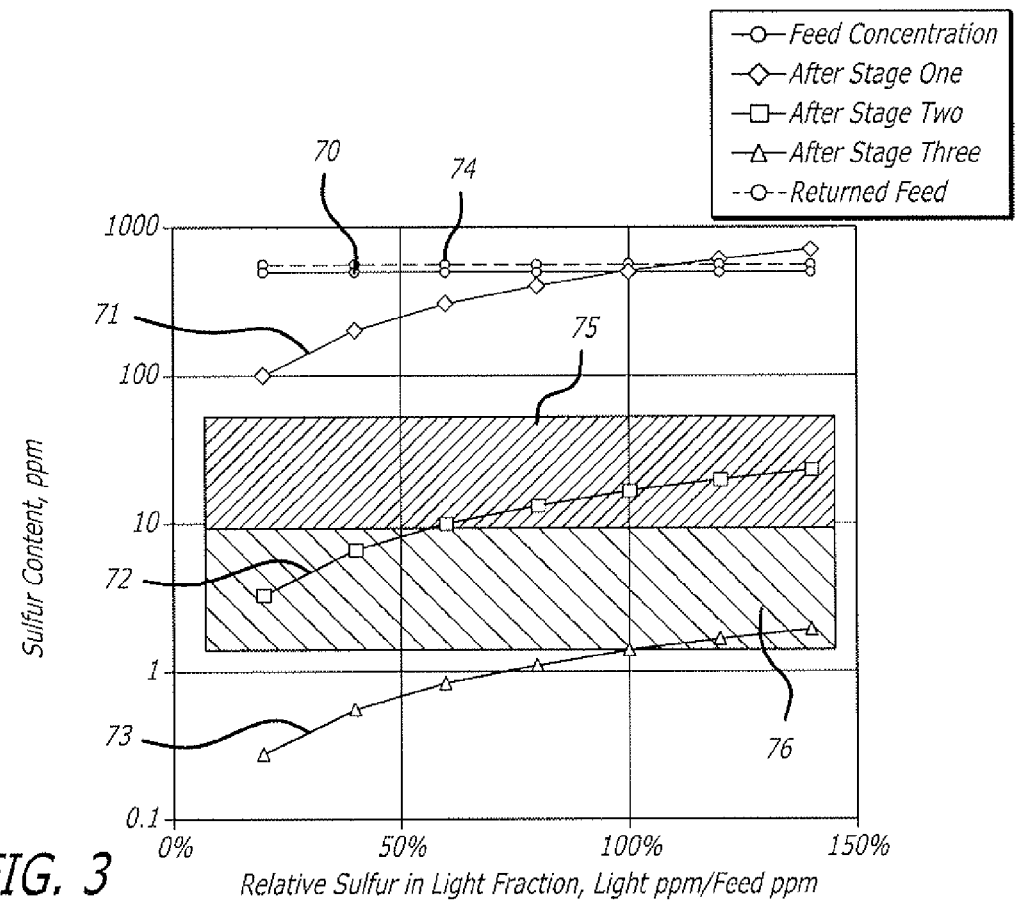
FIG. 3 is a diagram illustrating the results of experimental tests on a performance model of the system and process shown in FIGS. 1 and 2.

The system and process represented in FIG. 1 and FIG. 2 have been modeled to assess the ability to effectively provide a clean, low-sulfur auxiliary fuel supply. FIG. 3 shows a diagram reporting the results of the performance of such a model. The model was developed assuming a feed fuel stream similar to JP-8 military fuels with 500 ppm of sulfur by weight. A typical JP-8 fuel has a boiling point range from approximately 140° C. to 300° C. and is composed of multiple compounds: 57% paraffins, 20% cycloparaffins, 20% aromatics, and 3% miscellaneous.

The data from the model was plotted on the chart with the y-axis indicating the sulfur content of the fuels. The x-axis is a measure of the type of sulfur compounds in the feed as represented by the relative sulfur concentration in the lighter fraction in comparison to the total feed. Therefore, a value of 100% indicates that the sulfur concentration is uniform across the fuel's boiling point range. Detailed sulfur analysis of several samples of Jet-A fuel with bulk sulfur concentrations in the range of 1500 ppm to 3000 ppm has indicated that a majority of the sulfur compounds are relatively heavy, consisting of di-benzothiophenes type compounds. When a 30% light fraction is obtained approximately 70% reduction in the sulfur concentration is achieved, indicating a bulk fuel with 1500 ppm sulfur will produce a light fraction with 450 to 500 ppm sulfur. This indicates the "relative sulfur in light fraction" is approximately 30 to 35% for typical Jet-A fuel, obtained from commercial sources in Long Beach, Calif. in 2005. Modifications in up-stream refinery processes may change this characteristic.

The feed concentration of the fuel is represented as the gray line 70 and would be the concentration of the stream 32 of FIG. 2. The stage-one separator was modeled as a non-selective separation and 30% of the bulk fuel was extracted in the stage-one permeate 34 of FIG. 2. Since the separation was not selective, the line with open circles 71 represents the relative sulfur in the light fraction which, in this case, is 30% of the bulk fuel.

The stage-two separation extracted 40% of the feed stream 42 as permeate 44 and achieved a selectivity which removed 98% of the sulfur in the feed. This data is consistent with published performance data from W. R. Grace's PPVM modules for benzo-thiophenes and lighter sulfur compounds in an intermediate cut naphtha fuel stream (Zhao X., Krishnaiah G., and Cartwright T.; *Membrane Separation for Clean Fuels*; PTQ Summer 2004) the content of which is incorporated herein by reference in its entirety.

The performance of the stage-two separation is illustrated as the open square line 72, which indicates that sulfur levels of under 10 ppm are achievable if the relative sulfur in the light fraction is less than 60%. If the required sulfur level in the auxiliary fuel is under 10 ppm or the relative sulfur concentration greater than 60%, a third stage may be needed. In this example the stage-two retentate 47 was further treated with a liquid-phase sulfur adsorbent or absorbent in a third-stage adsorbent or absorbent module, which achieved a 95% removal performance. The resulting concentration of sulfur in the product stream is represented by the open triangle line 73 that illustrates concentration levels less than 2 ppm across the complete range of relative sulfur levels in the light fraction.

Figure 4:
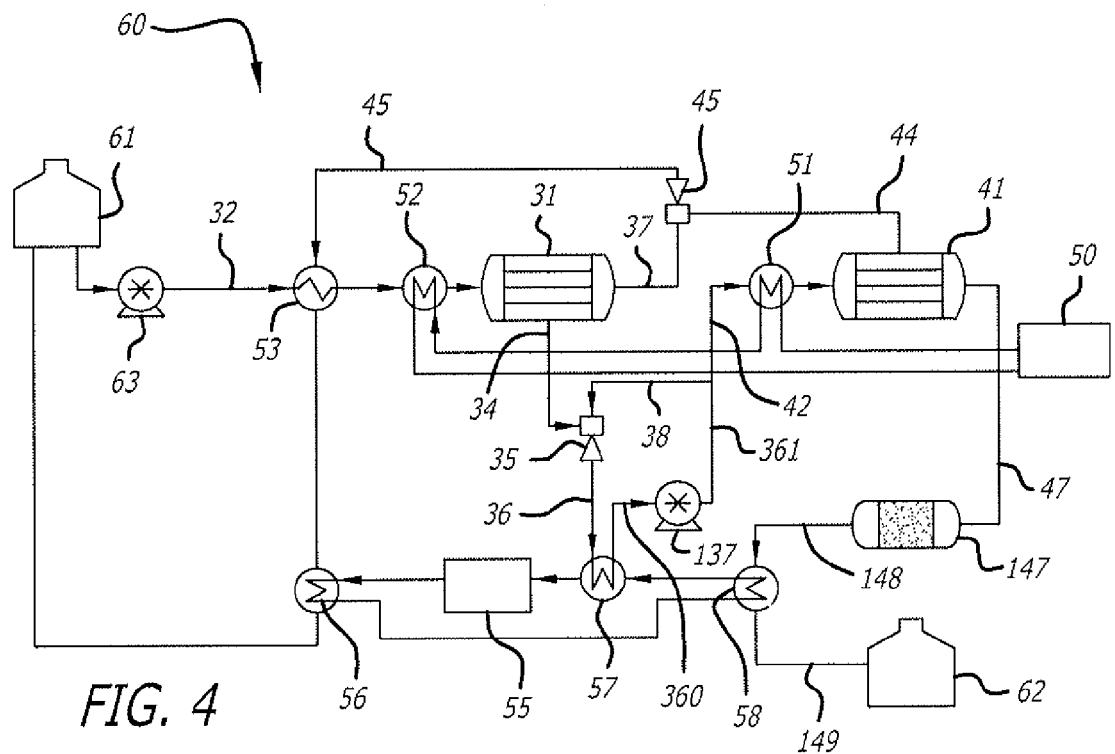
FIG. 4 is a simplified schematic flow diagram of another embodiment of the system in accordance with the present disclosure.

Further embodiments of the process and system can include the addition of this third stage adsorbent or absorbent module to polish the final auxiliary fuel stream. FIG. 4 shows an exemplary implementation of such embodiments. With reference to FIG. 4, the system is identical to that of FIG. 2 except that a sorbent-type polishing filter bed 147 is added to the process system in the stage-two retentate stream 47. If the down stream applications for the slip stream require very low sulfur concentrations then the polishing filter bed 147 is added. Sulfur compounds in the stage-two retentate are trapped in the sorbent-type bed such that the stream 148 leaving the bed 147 has very low sulfur concentrations similar to the model results presented as line 73 of FIG. 3.

The polishing filter bed 147 may be an adsorbent similar to high surface area carbon or carbon with specific surface modifications tailored to adsorbing the polar sulfur compounds. The bed 147 may be an absorbent or reagent designed to react with the sulfur atom in the compounds resulting in a non-soluble sulfur inorganic salt that is trapped in the bed.

In summary, the present disclosure relates to a multi-stage process for the separation of a slip stream of fuel with low-sulfur concentration from a primary multi-component fuel stream. The primary multi-component fuel is fed to the first stage in which a slip stream is isolated containing lighter components and the heavier components are retained in the retentate stream. The lighter component slip stream is further processed by the second-stage membrane in which the sulfur components of the slip stream are selectively removed from the feed as second-stage permeate and a second-stage retentate is recovered as the low-sulfur auxiliary fuel supply.

In another aspect, the disclosure relates to a multi-stage process in which one or more of the stages are a selective membrane, and most specifically a polar or ionic, prevaporation membrane which has been designed to have selectivity for lighter sulfur compounds. Polymeric membranes such as Nafion (DuPont®), specially treated polyimides such as S-Brane (W. R. Grace) are examples of sulfur selective polar prevaporation membranes.

In another aspect, the disclosure relates to a multi-stage process in which one or more of the stages are a non-selective, high flux membrane. As with other preferred embodiments the stage-one permeate 34 is condensed and fed to a second-stage membrane process 41. The high flux membrane is selected when the relative sulfur in the light fraction is less than 100%, as has been validated for some Jet-A type fuels.

As with any evaporation, distillation, or prevaporation process the species evaporating from the bulk fluid is driven by the vapor pressure of the individual species at the liquid gas phase interface established within the membrane. The vapor pressures of the individual species are strongly dependent on the temperature, but all species have some finite vapor pressure, and therefore, as the light fractions evaporate trace amounts of the heavier species also evaporate. Depending on the specific sulfur compound species in the bulk fuel and the trace levels of these species in the stage-one permeate 34 further refinements to the stage-one process may be needed to achieve an overall effective system. Another preferred embodiment of the system divides the stage-one process into a stage-1A and stage-1B process. Both stage-1A and stage-1B are prevaporation, flux membrane, distillation, and/or evaporation type processes. The permeate 34 stream for the stage-1A is condensed, reheated and sent as the feed stream to the stage-1B process. The permeate stream for the stage-1B is condensed and sent to the stage-two process as previously described. This secondary stage-one process helps to enhance the selectivity through dual filtering of the trace species. The retentate streams from both the stage-1A and stage-1B are returned to the primary fuel tank.

Figure 5:
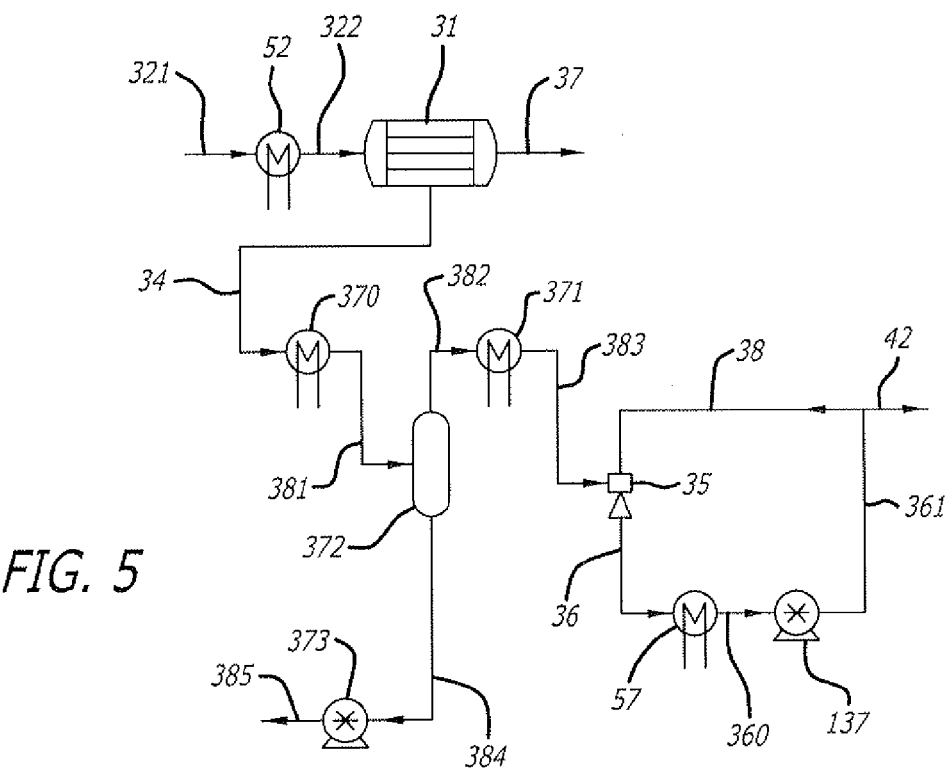
FIG. 5 is a partial schematic flow diagram of the stage-one portion of another embodiment of the system in which a two step condensation function is used on the stage-one permeate.

Another exemplary embodiment of the system in accordance with the present disclosure addresses the issue of trace amounts of heavier species in the stage-one permeate 34. In this embodiment a two-step condensing function is integrated into the process after the stage-one permeate stream 34 is created. FIG. 5 illustrates one preferred embodiment of this condensing function configuration applied to the systems shown in FIGS. 2 and 4. Here, like numbers are used to designate like elements previously discussed with reference to FIGS. 2 and 4.

The stage-one permeate 34 is passed through a partial condenser 370 in which the heaviest species are converted into liquid creating a two phase flow 381. The two phase flow 381 is passed into a gas-liquid separator 372 creating a liquid stream 384 and a vapor stream 382. The liquid stream 384 is returned to the primary tank 61 using a pump 373 and a return connection 385. The vapor stream 382 is condensed in a heat exchanger 371 and passes to the eductor 35 by way of connection 383. The process down stream of eductor 35 is similar to other embodiments of the system described above with reference to FIG. 2.

The multi-stage process in accordance with the present disclosure may be configured to have the pressurized retentate stream for the first stage flow through the motive side of an eductor to create a vacuum on the permeate side of the second stage. In this configuration all permeate compounds are returned to the primary fuel stream and the process is further simplified by eliminating the requirement for vapor liquid separation hardware. Enhancements of this process and system can include the cooling and/or condensation of the feed streams into the eductor 45 to improve the vacuum performance creating a lower pressure for the stage-two permeate stream 44. This cooling function can be direct, through the integration of a heat exchanger connected to the cooling system 55, or can be achieved with recuperative heat exchangers interfaced with other streams such as stage-two feed stream 42 prior to heating by heat exchanger 51, or with other streams such as stage-one feed stream 321 prior to heating by heat exchanger 52. Other thermal recuperation aspects and flow configurations are feasible to enhance process energy efficiency and the embodiments of this process are not limited by the configurations that have been illustrated for simplicity.

A multi-stage process in accordance with the disclosure may be configured such that the condensed permeate of the first stage flows through the motive side of an eductor to create a vacuum on the permeate side of the first stage. In this configuration the process is further simplified by eliminating the requirement for vapor liquid separation hardware. In yet another aspect, the disclosure relates to a multi-stage process in which the thermal energy in the mixture of the first stage retentate and the second stage permeate is recuperated and transferred to the first stage feed to minimize thermal energy requirements.

A multi-stage process in accordance with the disclosure may be configured such that the peak thermal energy is provided to the stages through integration with the reject heat from the primary engine in a vehicle. The thermal cooling energy may be provided to the stages through integration with the vehicle's vapor compression system typically used to condition the air within the vehicle's cabin.

In yet another aspect, the multi-stage process may be configured such that membrane systems are used to extract a low-sulfur slip stream which is later used in a fuel cell or hydrogen generation system. For example, the initial stage membrane systems may also be integrated with a last polishing stage consisting of absorbent or adsorbent materials designed to extract the sulfur compounds to levels below 10 ppm concentrations.

The following modeled examples 1 through 4 are provided to describe the disclosure in further detail. These modeled examples, which set forth a preferred mode presently contemplated for carrying out the disclosure, are intended to illustrate and not to limit the disclosure.

Example 1

Auxiliary Clean Fuel Stream for a 2-10 kW APU

Trucks and HumVee type vehicles use varying quantities of diesel or logistic fuel (JP-8) depending on the speed, load being carried, and other parameters. Usually the main engine needs to operate even during non-drive time to supply heating or A/C or communication power needs. In order to improve the overall fuel efficiency and to reduce the times main engine needs to be operated, the heating and air-conditioning and night-watch communication power may be supplied by a fuel cell operating on hydrogen that will be generated using a low-sulfur clean fuel (approximately, 5 to 15% of the bulk fuel) separated from the primary fuel.

Making reference also to the diagrams illustrated in FIGS. 1, 2 and 4, primary fuel from fuel tank 61 having a sulfur content of 500 ppm is pumped to 100 psig and sent to heat exchangers 53 and 52 where its temperature is raised to 250° C., and then fractionated, separated or partially vaporized in unit 31 by letting down to ambient pressure. The vapor stream or permeate stream 34 is condensed (about 25% of feed by volume) by mixing in an eductor unit 35 with condensed recycle stream 38. The condensed light hydrocarbon stream contains about 400 ppm by volume of sulfur but is free of additives and contains only trace amounts of higher boiling hydrocarbon components. Then the condensed light stream 42 is sent to an exchanger 51 and to membrane separator 41, where it is split into a liquid retentate stream 47 and a vapor permeate stream 44, which is combined with the heavy stream 37 from unit 31 and returned back to primary fuel tank as stream 45 containing about 550 ppm sulfur and all of the additives. The stream 47 contains less than 9 ppm sulfur and is the clean auxiliary fuel that is used in APU reformers (not shown here) for making syngas or hydrogen for use in fuel cells that produce electric power.

Example 2

Auxiliary Fuel Containing 1 ppm or Less

Where some reformers may need auxiliary fuels that contain 1 ppm or less sulfur, then another separation (like unit 147) is added as described below and illustrated in FIG. 4. The retentate stream 47 is passed through separator 147, which is a polishing stage that absorbs and retains the remaining sulfur species. Ultra clean retentate with less than 1 ppm sulfur is generated as stream 148 and cooled if necessary in unit 58 and stored in the clean auxiliary fuel tank or used by the APU reformer system (not shown here).

Example 3

Auxiliary Clean Fuel for APUs in Aircrafts

Currently commercial and civilian aircrafts have APUs that are generally 50 to 250 kW in size that use JP-8 fuel in combustion process at low efficiencies and producing pollutants even when they are on the ground. These APUs can be converted to low or non-polluting hydrogen based fuel cells as discussed in Example 1, using auxiliary fuel generated from the bulk fuel in the aircraft.

Example 4

Auxiliary Clean Fuel for APUs on Ships

Naval ships and merchant marine vessels can also be equipped with the auxiliary fuel production and reformers and fuel cells producing clean power while these ships are docked at port, as taught in Example 1, but at larger capacities 250 to 750 kW scales.

The following examples 5 through 7 represent the results of experiments actually performed rather than results of modeling.

Example 5

Flash Vaporizer-fractional Distillation as the Stage-one Separator and Polar Prevaporation Membrane as Stage-two Separator with 20% Cuts in Both Stages A Jet Fuel (JetA) sample containing 1530 ppm sulfur was subjected to fractional distillation and the distillates were found to contain the following sulfur levels. The JetA fuel sample was analyzed using a gas chromatograph equipped with atomic emissions detector (AED).

TABLE A

| | Sulfur distribution in distillate cuts | | | | |
|---|---|---|---|---|---|
| Sample # | Thiols, sulfides & disulfides, ppm | Thio-phenes, ppm | Benzo-thiophenes, ppm | Dibenzo-thiophenes, ppm | Total sulfur, ppm |
| 10% cut | 361 | 53 | 81 | 0 | 495 |
| 20% cut | 433 | 23 | 121 | 0 | 577 |
| 30% cut | 530 | 30 | 157 | 4 | 721 |
| 30-100% cut | 978 | 21 | 1031 | 25 | 2055 |
| Whole JetA | 824 | 25 | 674 | 17 | 1530 |

The above Table A illustrates the characteristics of various cuts or section of the bulk hydrocarbon fuel. The last row indicates the sulfur concentrations of the bulk fuel defined as Whole JetA containing the 1530 ppm sulfur level. Most of these sulfur species were identified as light sulfurs such as thiols, sulfides, and disulfides (824 ppm) and heavier sulfurs such as benzo-thiophenes (674 ppm). The row identified as 10% cut represents the fraction of the fuel where only the lightest species are removed similar to a stage-one permeate, while the 20% cut represents the next fraction or the 10-20% cut which excludes species removed in the 0-10% cut and left in the 20-100% cut. As indicated by the values lighter fractions had less sulfur (495 to 721 ppm) than the bulk fuel (1530 ppm) indicating a relative sulfur in light fraction between 25% for the 10% cut and 50% for the 30% cut. Also the data indicates that most of the heavy sulfur species, represented by the dibenzo-thiopenes, remained in the 30-100% cut which would be the stage-one retentate that would be returned to the primary tank.

The second distillation cut (0-20% by volume) having 577 ppm total sulfur was preheated to 125° C. and passed through a stage-two membrane (SB4034.4) that was maintained at 125° C. and at 26" Hg vacuum. Permeate from the second stage (at a 20% stage-cut) contained 1130 ppm total sulfur and the retentate from stage two contained 500 ppm total sulfur. The total sulfur reduction after stage one is 62% and the total sulfur reduction after stage two is 67%. The gasoline range sulfur, which is defined as sulfur in compounds boiling below 220° C. (4280 Fahrenheit), is reduced from 200 ppm in stage one product to 120 ppm in the stage-two retentate. This test indicates preliminary data that supports the effectiveness of the concept but additional selectivity will be needed for most practical applications.

Example 6

Flash Vaporizer-fractional Distillation as Stage-one Separation and Polar Prevaporation Membrane as the Stage-two Separation with 9% Cut in Permeate Stage-one and 25% Cut in Stage-two Separation A Jet Fuel sample was analyzed using gas chromatograph equipped with flame photometric detectors (PFPD). Table B below indicates the sulfur species for both the whole jet fuel and for the 9% cut obtained from the stage-one permeate. The sulfur species are shown in greater detail and have been organized within the table with the lightest species at the top of the table and the heavier species at the bottom of the table. A subtotal is provided for the sulfur species typically found in the gasoline fuel fractions indicating the light sulfur species of interest. As indicated by the data the relative sulfur in light fraction was approximately 40% (611 ppm/1473 ppm). The 9% cut also illustrated the elimination of a greater fraction of the heavy sulfur species, those above the gasoline range.

TABLE B

The 9% cut sample from fractional distillation (1st stage)

|  | whole jet | 9% cut |
|---|---|---|
| Mercaptans | 3 | 4 |
| Thiophene | 1 | 1 |
| MethylThiophenes | 2 | 3 |
| TetrahydroThiophene | 1 | 1 |
| C2-Thiophenes | 3 | 13 |
| C3-Thiophenes | 23 | 67 |
| C4-Thiophenes | 146 | 167 |
| Thiophenol | 3 | 5 |
| MethylThiophenol | 6 | 9 |
| Subtotal GasolineRange S | 188 | 270 |
| BenzoThiophene | 34 | 7 |
| C1-Benzothiophenes | 257 | 157 |
| C2-Benzothiophenes | 362 | 109 |
| C3-Benzothiophenes | 488 | 68 |
| C4+-Benzothiophenes | 141 | 0 |
| Dibenzothiophenes | 3 | 0 |
| Total S, ppm by wt | 1473 | 611 |

In stage two, the 9% cut distillate was preheated to 125° C. and fed to stage-two membrane maintained at 125° C. and 26" Hg vacuum. The permeate from stage two (at a 26% stage cut) contained 710 ppm sulfur and the retentate contained 427 ppm sulfur, again indicating the sulfur selectivity of the stage-two prevaporation membrane. The gasoline-range sulfur is removed selectively by the stage-two prevaporation process through the membrane, whereas the higher boiling sulfur compounds are not reduced effectively. It is therefore preferable to get a lighter distillate cut that eliminates more of the trace heavy sulfur species at the stage-one separation process for more effective, overall desulfurization process.

Example 7

High Flux Prevaporation Membrane with Two Step Condensation

This example pertains particularly to FIG. 5 in which two condensers 370 and 371 are utilized. The JetA fuel sample was sent through a high flux membrane at 120° C. and 26" Hg vacuum functioning as a stage-one process. The stage-one permeate 34 was partially condensed into a liquid stream 384 and a vapor stream 382 further helping to separate the heavy compounds from the light compounds. Here, further removal of heavy, high boiling sulfur compounds were rejected from the stage-one permeate 34 by use of the partial condenser 370. A 20% stage-one cut (20% of feed was permeate 34 and 80% of feed was retentate 37) was extracted as permeate 34, and the sulfur composition results are provided in Table C below as stage-one permeate without the partial condensation. The data indicates that the relative sulfur in the permeate 34 was less than 15% of the original sulfur concentration (181 ppm versus 1473 ppm). Although this data indicates a substantial reduction in the sulfur compounds with the stage-one evaporation, some of these components, those identified below the subtotal defined in Gasoline Range S of Table C, are very difficult to remove in the stage-two 16 process as indicated in FIG. 1 above. This presents an issue that must be addressed.

TABLE C

High Flux membrane as Stage-one with JetA fuel

| Sulfur Compounds (first 9 are lighter or gasoline range sulfur compounds and last six are heavier sulfur compounds) | Stage-one feed (whole jet fuel) | Stage-one permeate without partial condenser |
|---|---|---|
| Mercaptans | 3 | 4 |
| Thiophene | 1 | 1 |
| MethylThiophenes | 2 | 3 |
| TetrahydroThiophene | 1 | 1 |
| C2-Thiophenes | 3 | 13 |
| C3-Thiophenes | 23 | 40 |
| C4-Thiophenes | 146 | 48 |
| Thiophenol | 3 | 4 |
| MethylThiophenol | 6 | 8 |
| GasolineRange S | 188 | 122 |
| BenzoThiophene | 34 | 1 |
| C1-Benzothiophenes | 257 | 15 |
| C2-Benzothiophenes | 362 | 43 |
| C3-Benzothiophenes | 488 |  |
| C4+-Benzothiophenes | 141 |  |
| Dibenzothiophenes | 3 |  |
| Total S, ppm by wt | 1473 | 181 |

Figure 6:
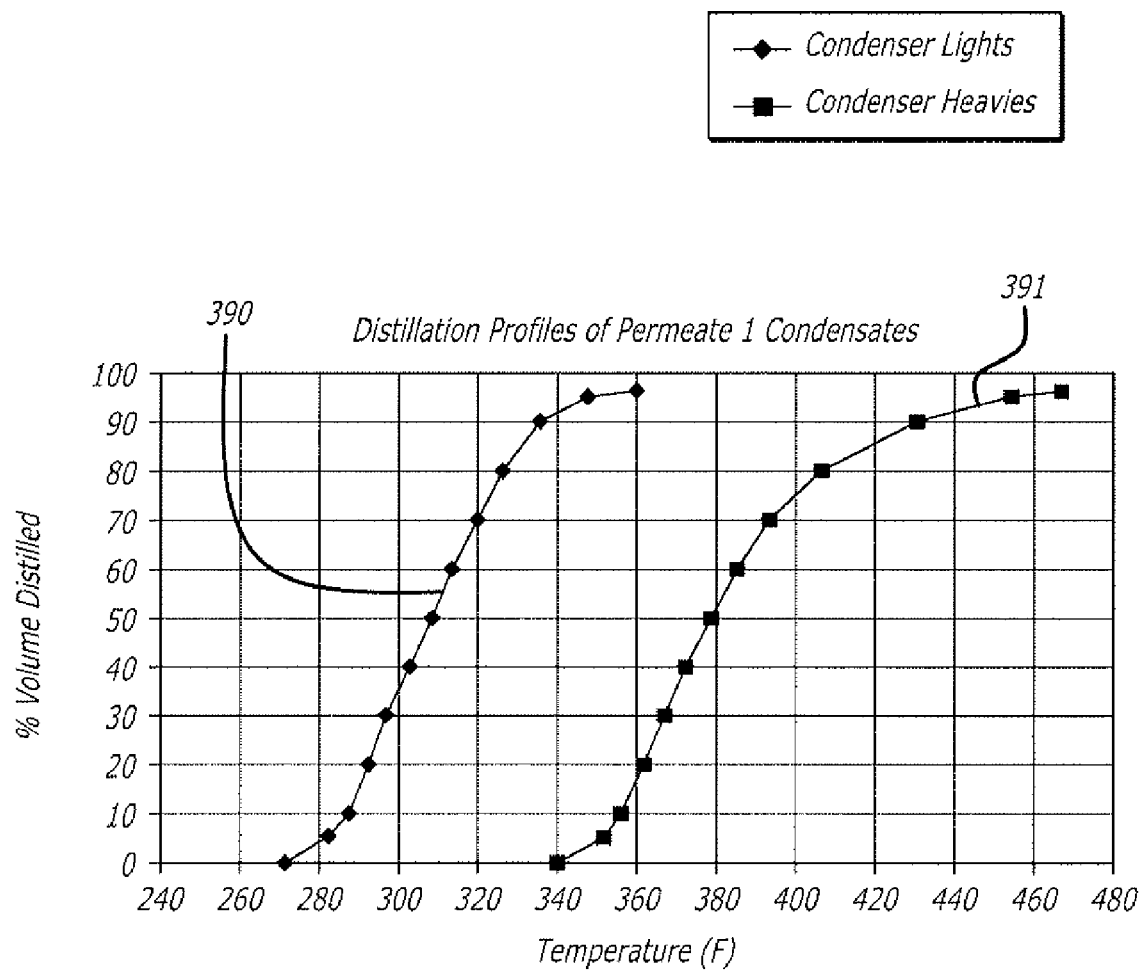
FIG. 6 is a chart illustrating the distillation profiles of permeate 1 condensates.

To address this issue, the partial condenser approach illustrated in FIG. 5 is incorporated into the stage-one 11 process. The stage-one permeate 34 is cooled by a heat exchanger 370 only partially such that only the heaviest of compounds are condensed and the lightest compounds remain in the vapor state so that the exit stream 381 is part vapor and part liquid. This exit stream 381 enters a separator 372 in which the liquid phase or heavier compounds exit as liquid stream 384 and the vapor phase or lightest compounds exit as vapor stream 382. The lightest compounds in the vapor stream 382 are further cooled in heat exchanger 371 until all of the components are condensed and exit as liquid stream 383. Now in reference to FIG. 6, a comparison of the distillation curve for the lightest compounds of liquid stream 383 are illustrated by line 390 and the heaviest compounds of liquid stream 384 are illustrated by line 391.

A sulfur analysis of the partial condensation process above-described was completed and is presented in Table D. The sulfur concentration in the stream 384, or heaviest of compounds (Heavy condensate), and stream 383, or lightest compounds (Light condensate), are defined. It was discovered that the light condensate stream 383 contained no heavy sulfur. The heavy sulfur compounds were condensated and contained in stream 384, which are returned to the tank.

majority of the sulfur compounds are heavier than the light fractions isolated as the stage-one permeate stream 34. This stage-one permeate stream 34 in the vapor state can be treated by polishing filter. The polishing filter may contain a catalyst where the sulfur compounds are selectively converted to $H_2S$ or $SO_2$ and $SO_3$ by adding either $H_2$ gas or air respectively to increase the selectivity of the absorption bed portion of the polishing filter or to enhance condensation in the first partial condenser. The catalyst system can be heated to temperatures of 100° C. to 350° C. to improve reactivity.

TABLE D

Two-Stage Condenser for Stage-one Permeate

| Sulfur Compounds (first 9 are lighter or gasoline range sulfur compounds and last 6 are heavier sulfur compounds) | Stage-one feed (whole jet fuel) | Stage-one Permeate before condensers | Stage-one Retentate | Heavy Condensate (stream 384) | Light Condensate (stream 385) |
|---|---|---|---|---|---|
| Mercaptans | 3 | 4 | 3 | 0 | 8 |
| Thiophene | 1 | 1 | 1 | 0 | 2 |
| MethylThiophenes | 2 | 3 | 2 | 0 | 6 |
| TetrahydroThiophene | 1 | 1 | 1 | 0 | 2 |
| C2-Thiophenes | 3 | 13 | 1 | 2 | 24 |
| C3-Thiophenes | 23 | 40 | 19 | 45 | 35 |
| C4-Thiophenes | 146 | 48 | 171 | 93 | 3 |
| Thiophenol | 3 | 4 | 3 | 7 | 1 |
| MethylThiophenol | 6 | 8 | 6 | 15 | 1 |
| GasolineRange S | 188 | 122 | 204.5 | 162 | 82 |
| BenzoThiophene | 34 | 1 | 42 | 2 | |
| C1-Benzothiophenes | 257 | 15 | 318 | 30 | |
| C2-Benzothiophenes | 362 | 43 | 442 | 86 | |
| C3-Benzothiophenes | 488 | | 610 | | |
| C4+-Benzothiophenes | 141 | | 176 | | |
| Dibenzothiophenes | 3 | | 4 | | |
| Total S, ppm by wt | 1473 | 181 | 1796 | 280 | 82 |
| Yield, vol. % | 100 | 20 | 80 | 10 | 10 |

Figure 7:
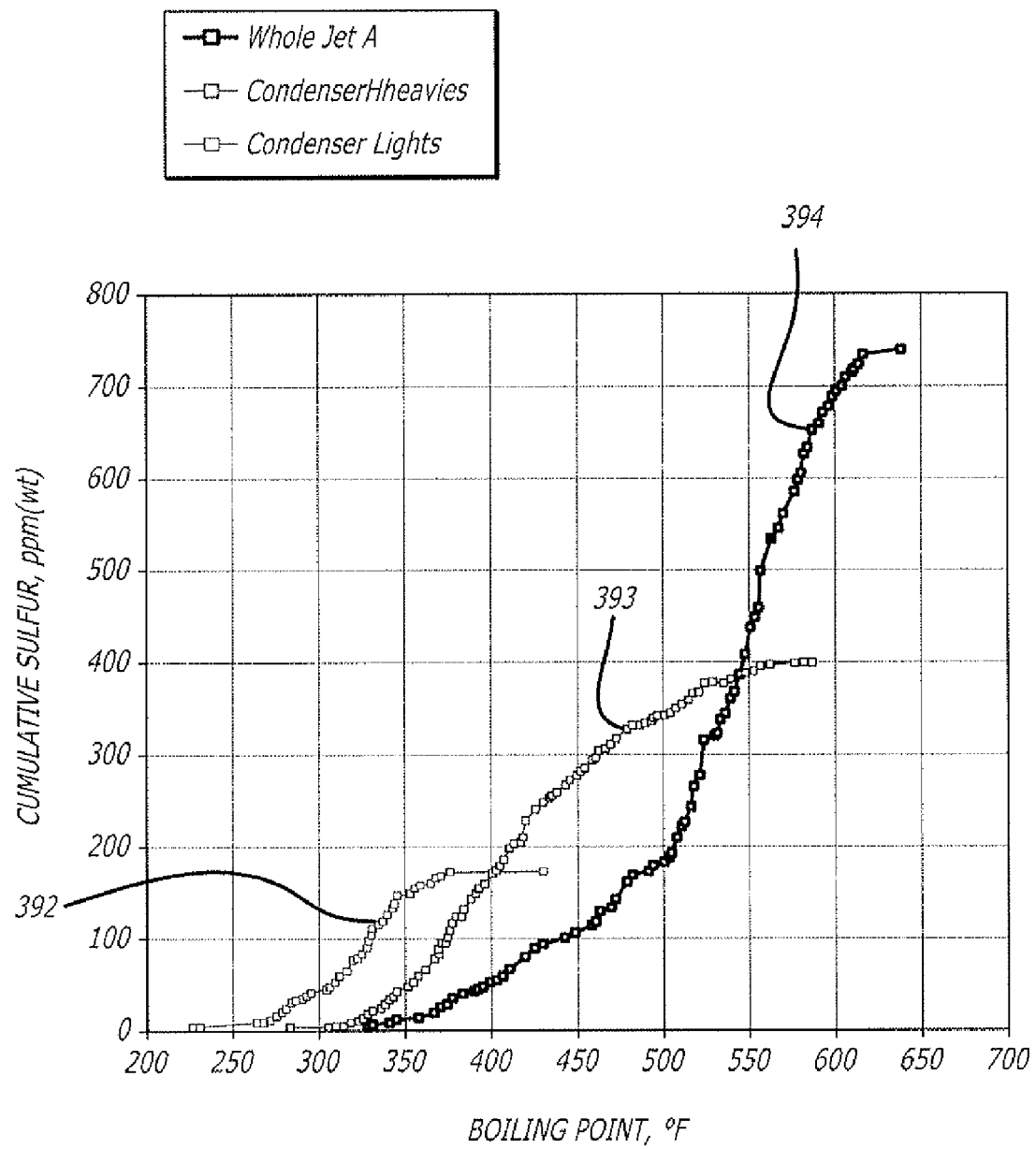
FIG. 7 is a chart illustrating the sulfur concentrations of the various condensates.

The sulfur concentrations, as a function of boiling point for the various condensates, are illustrated in FIG. 7. In this figure data line 394 represents the stage-one feed stream 321 or whole jet fuel as it enters the system shown in FIG. 5. Data line 393 represents the heaviest compounds exiting the first partial condenser 370 and in the permeate 34 as separated as stream 384 and data line 392 represents the lightest compounds stream 382 of FIG. 5.

The Light condensate from the second condenser 371 was sent to the stage-two separator 41 or the sulfur selective S-Brane membrane separator. The stage-two retentate 47 is recovered as the clean auxiliary power fuel stream. The stage-one retentate 37 and stage-one first partial condensate stream 384 are combined with the stage-two permeate 44 and sent back to the primary fuel tank.

Figure 8:
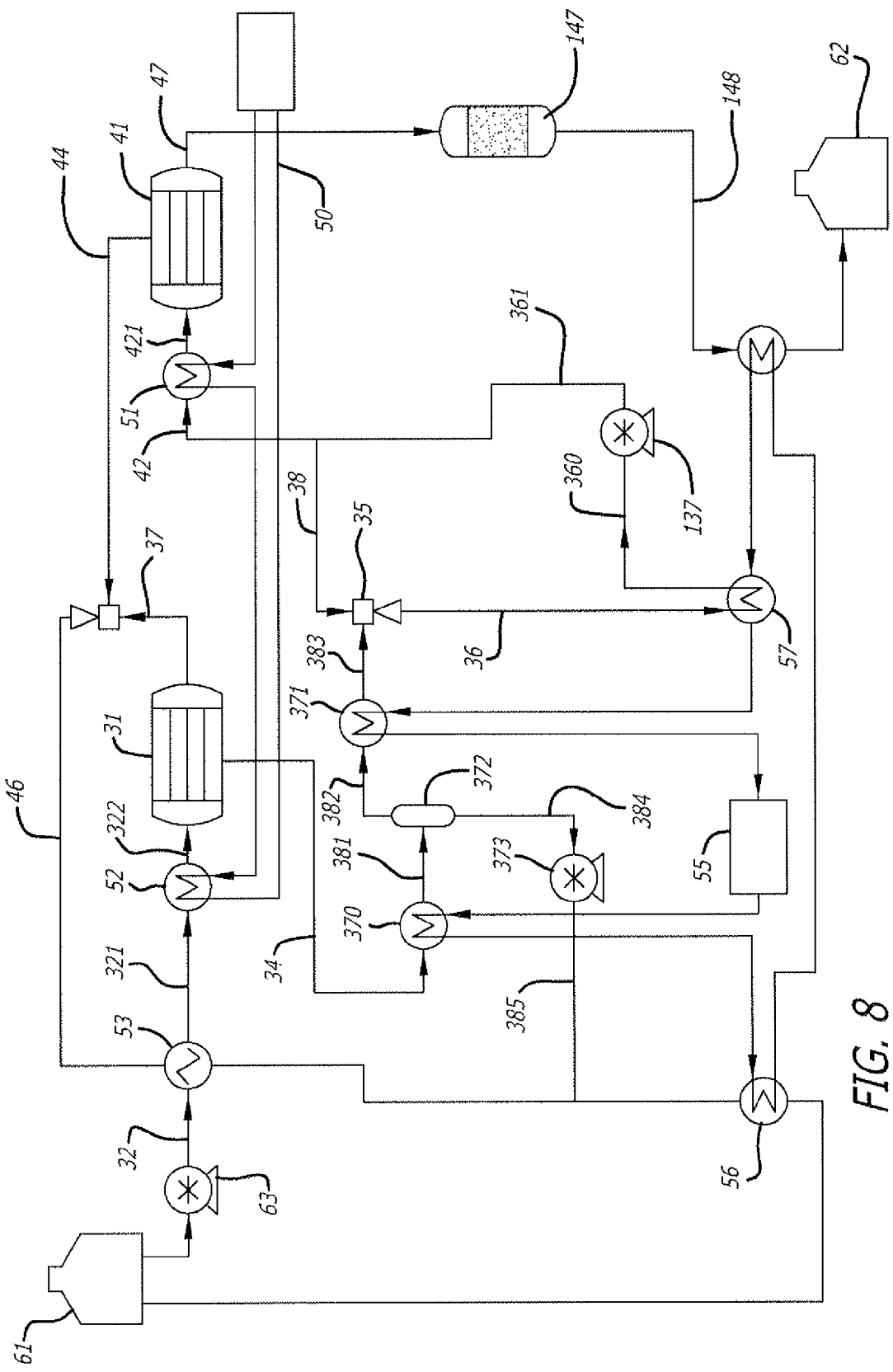
FIG. 8 is a schematic flow diagram of another embodiment of the system in accordance with the present disclosure.

This embodiment of the system, which utilizes two condensers in line with the stage-one permeate, is illustrated in FIG. 8. The primary fuel from the tank 61 is pressurized by a pump 63 in a primary fuel feed stream 32. The primary fuel feed stream 32 is then heated by the process recuperative heat exchanger 53 to a primary fuel first hot feed stream 321. The primary fuel first hot feed stream 321 is then heated by the hot engine fluid 50 in the heat exchanger 52 to a primary fuel second hot feed stream 322. This second hot feed stream 322 is then fed to the stage-one separator 31 in which it is separated into the stage-one retentate stream 37 and stage-one permeate stream 34. The majority of the sulfur compounds are retained in the retentate stream 37 because, typically, a The stage-one permeate stream 34 is then cooled by a heat exchanger 370 only partially such that only the heaviest of compounds are condensed and the lightest compounds remain in the vapor state so that the permeate stream 381 is part vapor and part liquid. This stream enters a separator 372 in which the liquid phase or heavier compounds exit as liquid condensate stream 384 and the vapor phase or lightest compounds exit as vapor stream 382. The lightest compounds in vapor 382 are further cooled in heat exchanger 371 until all of the components are condensed and exit as liquid stream 383. This vapor stream 382 can be treated by passage through a polishing filter prior to entering the second partial condenser 371. The polishing filter may contain a catalyst where the sulfur compounds are selectively converted to $H_2S$ or $SO_2$ and $SO_3$ by adding either $H_2$ gas or air respectively to increase the selectivity of the absorption bed portion of the polishing filter. The catalyst system can be heated to temperatures of 100° C. to 350° C. to improve reactivity.

The liquid stream 383 is then conveyed into eductor 35 which is driven by the eductor's motive fluid 38. In the eductor 35, the stage-one Light condensate liquid stream 383 is put at vacuum, where the vacuum is due to the feed stream of eductor motive fluid 38. Exiting the eductor 35 is the combined liquid stream 36, which is a mixture of the stage-one Light condensate stream 383 and the eductor motive fluid 38. This combined liquid stream 36 flows to cooling heat exchanger 57 where it is cooled.

The hot liquid stream 36 is cooled in heat exchanger 57 into a cool liquid stream 360 which is increased in pressure by pump 137 and splits into motive stream 38 sent to eductor 35 and stage-two feed stream 42. Cooling unit 55 is a heat rejection element consisting of an air cooled or liquid cooled radiator or other appropriate mechanism such as the vehicle's air conditioning system through which excess heat can be removed form the system. Recuperative heat exchanger 53 transfers the heat from return fuel stream 46 to feed stream 32. To ensure that all the vapor in return stream 46 is condensed cooling heat exchanger 56 is included.

A portion of the liquid stream 361 is passed onto the stage-two separator 41, as stage-two feed flow 42. In the embodiment shown in FIG. 8, only a small part of the liquid stream 361 is passed onto the stage-two separator 41, while the most part flows to the eductor as eductor motive fluid 38. The use of liquid stream 361 as eductor motive fluid 38 eliminates the necessity of using a separate working fluid with its gas-liquid separators and dual downstream cooling heat exchangers. In steady state operations, the composition of the gas-liquid stream 36 is primarily the light hydrocarbon and light sulfur compounds as discussed more in details below. In steady-state operation the composition of fluids 383, 36, 38 and 361 are the same that support the direct condensation of gas-liquid stream 36 after it exits the eductor 35.

The stage-two feed 42 is passed to re-heat heat exchanger 51 and becomes a hot stage-two feed 421 that enters stage-two separator 41. The feed stream of the hot stage-two feed 421 is separated into a stage-two permeate stream 44 and a stage-two retentate stream 47. The sulfur selectivity of the membrane in stage-two separator 41 supports the transfer of a majority of the sulfur compounds in the stage-two permeate stream 44 while maintaining some of the light hydrocarbon compounds as the stage-two retentate stream 47. The stage-two retentate stream is passed through a sorbent-type polishing filter bed 147. Sulfur compounds in the stage-two retentate are trapped in the sorbent-type bed such that the stream 148 leaving the bed 147 has very low sulfur concentrations which is then cooled and stored in tank 62 as the auxiliary fuel supply.

Polishing filters may optionally be located in the vapor-phase of the stage-one permeate stream, which may be heated to temperatures from 100° C. to 350° C. In one embodiment, the polishing filter may contain a catalyst where the sulfur compounds are selectively converted to $H_2S$ or $SO_2$ and $SO_3$ by adding either $H_2$ gas or air respectively, to increase the selectivity and absorption capacity. $H_2S$ or $SO_2$ and $SO_3$ are then adsorbed in the polishing filters.

The complexity of sulfur compounds in liquid fuels is indicated by the information and species identified in the analyses above, and in fact each listing of species can be a range of individual compounds. In general the sulfur species can be separated into overlapping groups based on their chemical complexity and boiling point characteristics as shown in Table E below. The concentration of these species will vary based on the specific fuel and the refining process and feed stock used for the specific fuel. This variability makes developing an effective desulfurization process for auxiliary power applications difficult.

TABLE E

Segregation of Sulfur Species and Compounds into Groups

| Sulfur Compounds | Group 1 | Group 2 | Group 3 | Group 4 | Group 5 |
|---|---|---|---|---|---|
| Mercaptans | X | | | | |
| Thiophene | X | | | | |
| MethylThiophenes | X | | | | |
| TetrahydroThiophene | X | | | | |
| C2-Thiophenes | X | X | | | |
| C3-Thiophenes | | X | | | |
| C4-Thiophenes | | X | | | |
| Thiophenol | | X | X | | |
| Methyl-Thiophenol | | X | X | | |
| Benzo-Thiophene | | | X | | |
| C1-Benzothiophenes | | | X | X | |
| C2-Benzothiophenes | | | X | X | |
| C3-Benzothiophenes | | | X | | |
| C4+-Benzothiophenes | | | | X | X |
| Di-benzothiophenes | | | | X | X |
| C2- Dibenzothiophenes | | | | | X |
| C3- Dibenzothiophenes | | | | | X |
| C4- Dibenzothiophenes | | | | | X |
| More Complex Species | | | | | X |

Figure 9:
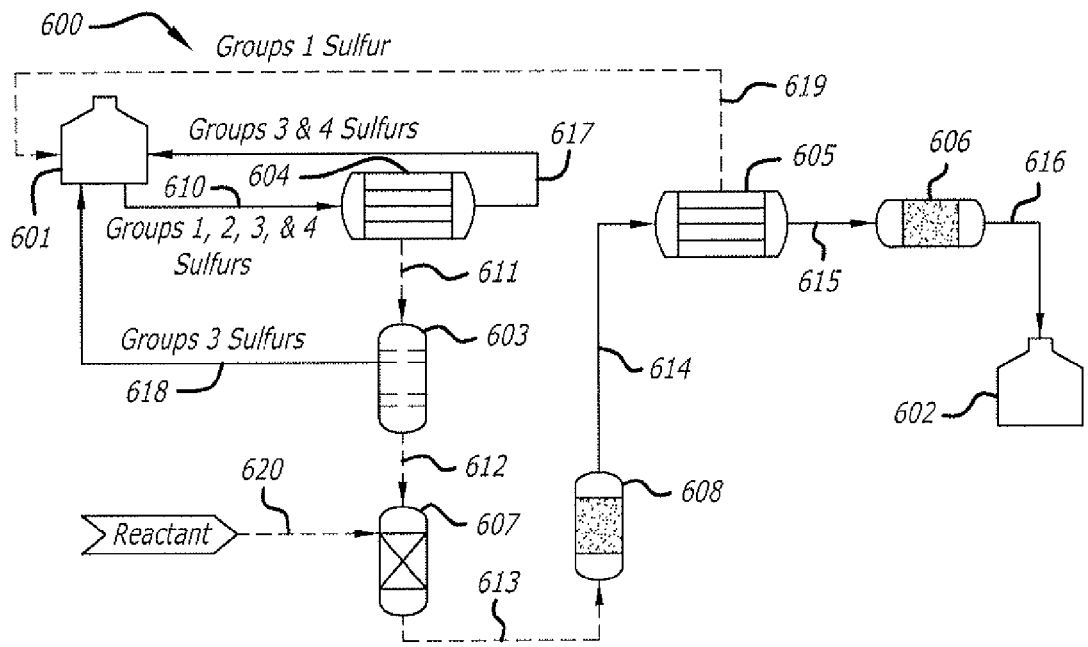
FIG. 9 is a simplified schematic flow diagram of another embodiment of the system in accordance with the present disclosure.

FIG. 9 provides a simplified conceptual flow diagram that outlines the overall scope of the innovative desulfurization process and system of the present disclosure. FIGS. 10, 11, 12, 13, and 14 in turn illustrate a number of different implementations of the process and system of the present disclosure.

Turning now specifically to the simplified system 600 shown in FIG. 9, the solid lines between components represent liquid phase connections and the dashed lines represent vapor phase connections, while heat exchanger, coolers, and heaters have been omitted to simplify the schematic representation. The elimination of these potential thermal integration components is not intended to limit the overall scope of the disclosure, but simply to facilitate ease of explanation at this point.

Feed fuel supply contained in tank 601 is separated and conditioned by the innovative process of this disclosure into a low sulfur fuel for auxiliary applications. The processed low sulfur fuel is stored in tank 602. Conventional approaches use an adsorbent or absorbent fixed bed that removes the sulfur species and delivering the clean fuel, but with the high concentrations of sulfur species these fixed beds can be large and/or require frequent replacement or regeneration making this simple process ineffective. The innovative process of this present disclosure gets around this inefficiency and ineffectiveness by selectively isolating specific sulfur species and returning them to the primary fuel tank 601 and/or reacting the non-isolated sulfur species so that they are easily isolated in downstream components.

In FIG. 9, liquid feed fuel from tank 601 is passed through connection 610 to stage-one membrane separator such as separator 604. The low boiling point fuel is extracted as a vapor from the feed fuel and passed to downstream components for additional processing through connection 611. In this embodiment one of these downstream processes may be a vapor phase reactive desulfurization (RDS) catalyst reactor 607 followed by a secondary isolation component 608. The reactive desulfurization catalyst reactor 607 uses a reactant entering the catalyst 607 through connection 620. The reactant can be a oxidant such as oxygen, air, a peroxide, steam, or other highly oxidative reactant that will provide oxygen atoms to the catalytic reactor 607. These RDS techniques are defined as oxygen desulfurization (ODS) techniques, in which the vapor phase sulfur species are oxidized to form compounds of $SO_2$ or $SO_3$ ($SO_{(x)}$) that are easily isolated on a sorbent bed(s). An example of a selective sulfur oxidation (SCO) catalyst is described by J. Lampert of Engelhard Corporation in *J of Power Sources*, Volume 131, Issues 1-2, 14 May 2004, Pages 27-34. The SCO catalyst is a precious metal catalyst supported on a honeycomb style monolith. The sorbent/trap for $SO_{(x)}$ is often mixed metal oxides in a single bed or in two consequent beds one for $SO_3$ and another for $SO_2$.

The reactive vapors can also be subjected to a reducing reaction using reactants such as hydrogen, or other highly reducing reactant. These RDS techniques are defined as hydro-desulfurization (HDS) techniques, in which the vapor phase sulfur species are reduced to form hydrogen sulfide or $H_2S$ that is easily isolated on a sorbent bed, made up of metal oxides such as Zinc oxide or mixed metal oxides such as CuO/ZnO/NiO or even transition metal impregnated activated carbon or zeolites such as TOSPIX94. Typical vapor phase HDS catalysts are Nickel-Molybdenum on alumina or Cobalt-Molybdenum on alumina.

The secondary isolation component can be a vapor phase sorbent bed 608 (adsorbent or absorbent) and/or a membrane separator 605 and/or a liquid phase sorbent bed 606 (adsorbent or absorbent) depending on the specific types of sulfur species in the feed mixture and depending on the specific types and quantities of sulfur species that are isolated in the stage-one permeate vapor phase 611 during the stage-one process. Each of these embodiments will be discussed in greater detail below.

In general and with respect to the sulfur species groupings defined in Table F, the stage-one membrane process is designed to eliminate species in the heavier groups, for example groups 3, 4 and 5. Based on the feedstock characteristic (gasoline, kerosene, and/or diesel fuel cuts) in tank 601 and the mass flow ratio between stage one permeate 611 and the feed 610, the effectiveness of isolating all of groups 3, 4, and 5 will vary. As indicated in Table D above the stage one membrane 604 was very effective at eliminating groups 4 and 5 sulfurs, but still had over 50 ppm of group 3 sulfurs. To eliminate these group 3 sulfurs a partial condenser 603 is placed down stream. As a result the light condensate of Table D, which represents the isolated fuel in connection 612 has very little group 3 sulfurs and consists primarily of group 1 and 2 sulfurs.

One approach would be to condense this vapor in connection 612 and process it by a second stage membrane reactor 605. Depending on the effectiveness of isolating the group 1 and 2 sulfurs in the stage two permeate 619 the final stage three sorbent bed 606 can be effective and not require too frequent change outs or regeneration cycles. This approach is outlined in greater detail with the discussion around FIG. 1 to 5 set forth above. If the stage-two membrane process is not effective enough at isolating group 1 and 2 sulfurs the alternative embodiment with the RDS catalyst 607 is needed.

Figure 10:
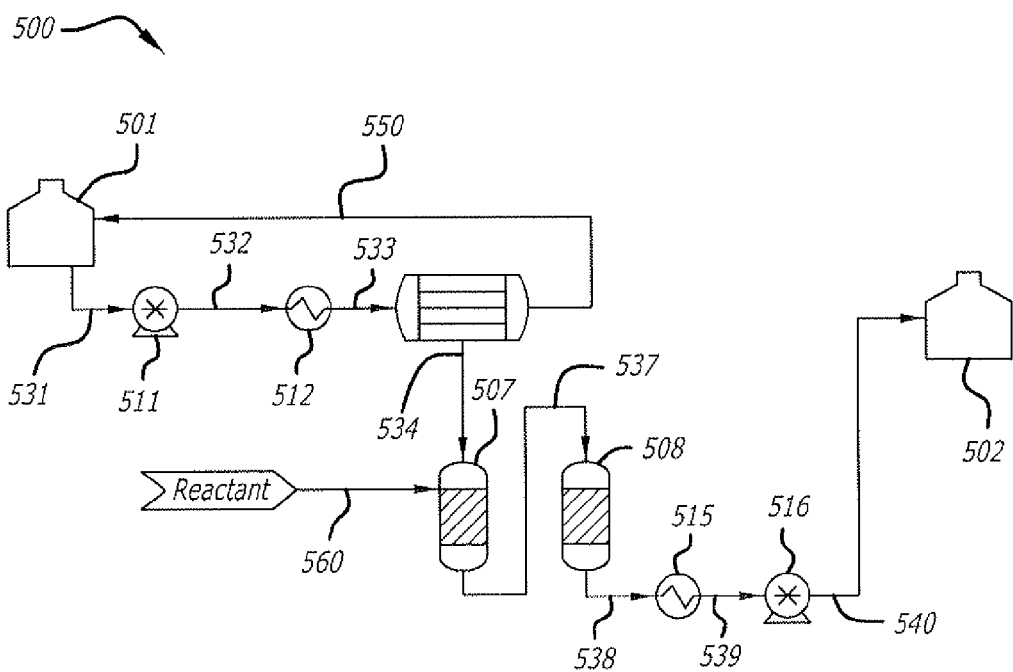
FIG. 10 is a schematic flow diagram of an exemplary system illustrative of a system shown in FIG. 9.

FIG. 10 illustrates one more detailed preferred embodiment 500 of this desulfurization process system. Fuel in tank 501 passes through connection 531 to pump 511 to connection 532 and heat exchanger 512. Heat exchanger 512 provides heat to the fuel raising its temperature before passing through connection 533 and into stage one membrane 504. The thermal energy used in heat exchanger 512 can be direct heat from any primary source or can be recuperated heat from systems outside the process boundary such as the primary vehicle engine, or can be recuperated heat from within the desulfurization process boundary or can be a combination of any of these sources. The fuel stream in connection 533 enters the stage one separator 504 in which the fuel is isolated into a stage one permeate stream 534 and a stage one retentate stream 550. The heavy sulfur groups are primarily isolated into the stage one retentate stream 550 and returned to the primary fuel tank. Only lighter sulfur groups remain in the vapor permeate stream 534. Reactant is metered into the system 500 through connection 560 and is mixed with permeate 534 and reacts on catalysts 507. The products of this reaction are sulfur species that are more easily isolated from the non-sulfur hydrocarbons. For example, they can be absorbed or adsorbed in sorbent bed 508 by passing through connection 537. This yields a low sulfur fuel vapor stream. The low sulfur vapor stream exits sorbent bed 508 through connection 538 and is condensed in heat exchanger 515 into a low sulfur fuel liquid. Heat exchanger 515 can be directly cooled by an external source such as a chiller, a cold heat sink outside the vehicle like ambient air from an aircraft at high altitude, or any recuperative cooling source within the system 500 or by any combination of these sources. The low sulfur liquid hydrocarbon auxiliary fuel then passes through connection 539 to pump 516 where it is pumped through connection 540 to the auxiliary fuel storage tank 502. This embodiment is very effective if the light sulfur groups in permeate 534 are effectively reacted in catalyst 507 and absorbed or adsorbed in sorbent bed 508.

Figure 11:
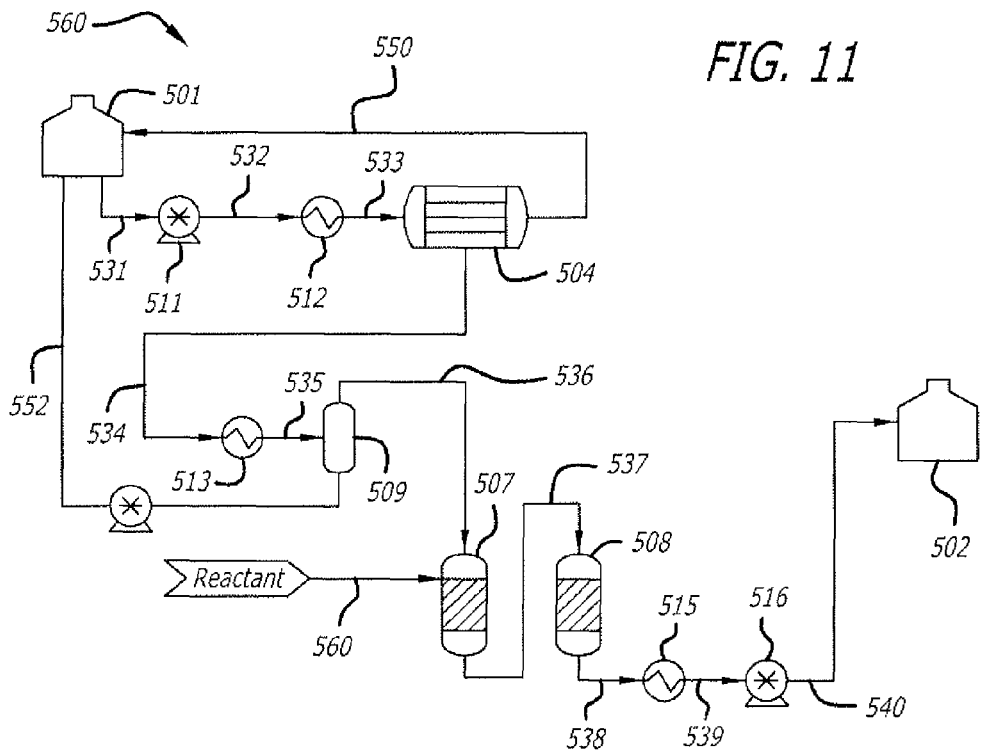
FIG. 11 is a schematic flow diagram of another exemplary system illustrative of an alternative system shown in FIG. 9.

If the mass ratio of permeate stream 534 to feed stream 533 is high in system 500, resulting in heavier sulfur groups in permeate stream 534, the addition of a partial condenser is potentially needed. A preferred embodiment 560 of the processing system that includes a partial condenser 513 is illustrated in FIG. 11. In this embodiment 560 the vapor phase permeate 534 is partially condensed in heat exchanger 513 and isolated in separator 509 after passing through connection 535. The condensed liquid stream with heavier sulfur groups are pumped through connections 551 and 552 by pump 514 and returned to the tank 501. The vapor phase fraction of stream 535 is isolated by separator 509 and passed through connection 536 to RDS catalyst 507. As in the previous embodiment the remaining sulfur species in vapor phase stream 536 are reacted with reactant from connection 560 on catalyst 507. These sulfur species are converted into sulfur species that are more effectively adsorbed or absorbed on sorbent bed 508.

Figure 12:
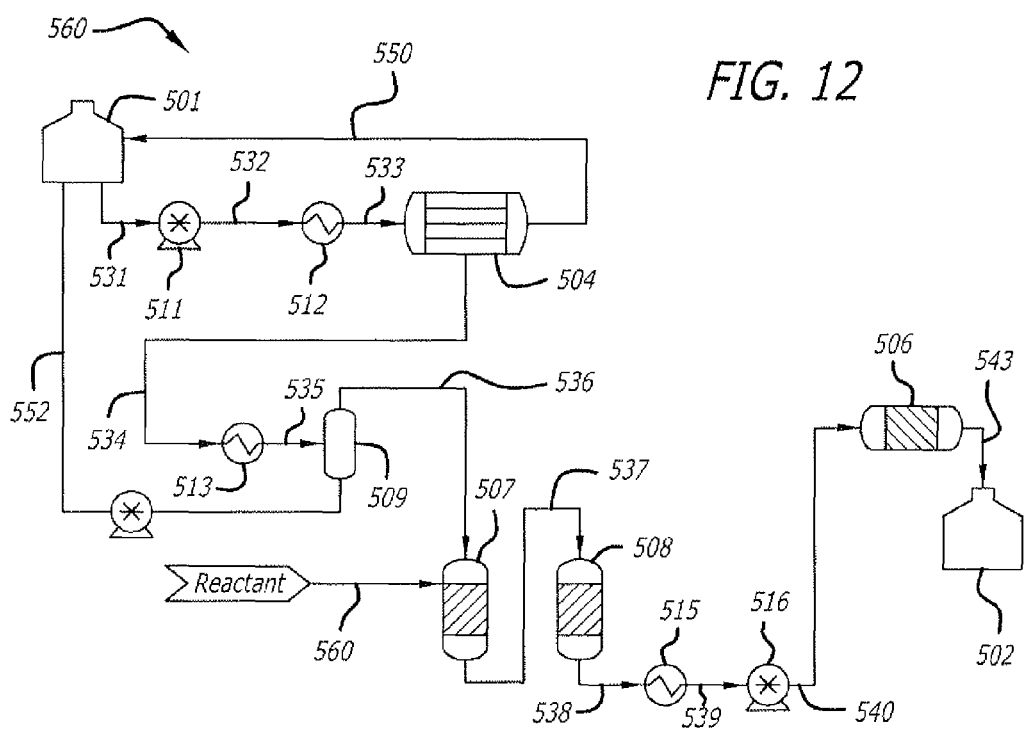
FIG. 12 is a schematic flow diagram of another exemplary system illustrative of an alternative system as in FIG. 9.

Another embodiment 570 of the processing system is illustrated in FIG. 12. If not all of the sulfur species in vapor steam 536 are reacted in catalyst bed 507 and isolated in sorbent bed 508, then a liquid phase sorbent bed is needed. In this embodiment 570 a liquid phase sorbent bed 506 is added just before the auxiliary fuel supply tank 502 to ensure that there is an acceptably low sulfur content in the feed stream through connection 543 of fuel being discharged into the auxiliary fuel tank 502. Otherwise the system 570 shown in FIG. 12 is identical to the system 560 shown in FIG. 11.

Figure 13:
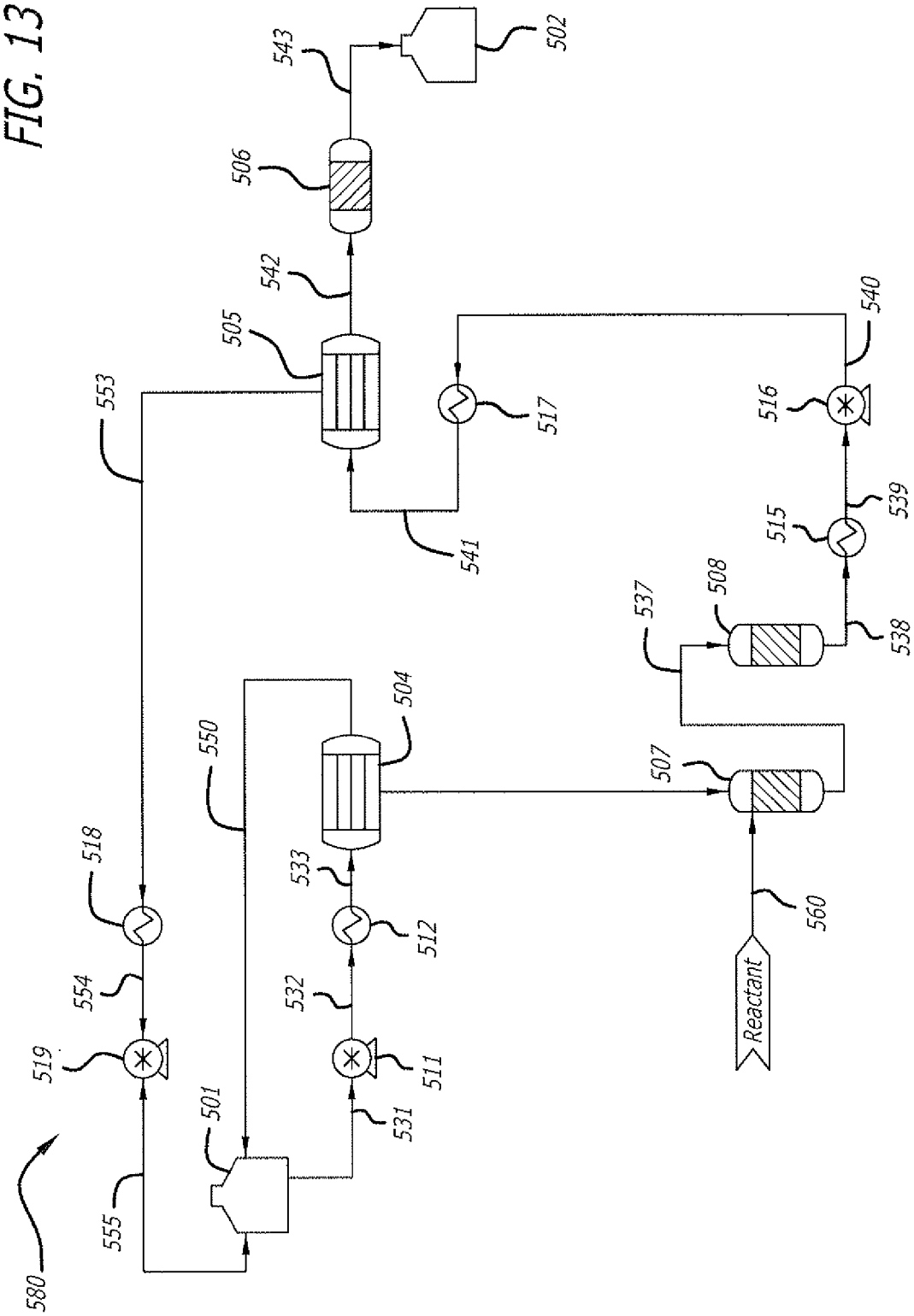
FIG. 13 is a schematic flow diagram of another exemplary system illustrative of an alternative system as in FIG. 9.

In another embodiment 580 of the processing system, illustrated in FIG. 13, the effectiveness of RDS catalyst 507 is limited to the heavier sulfur groups in vapor stream 534 and therefore, a high level of light sulfur groups 1 and/or 2 are not isolated by upstream processes and remain in the liquid stream in connection 540. In this case a second stage membrane reactor 505 can effectively be used to minimize or eliminate these groups from entering the liquid phase sorbent bed 506.

The liquid phase fuel in connection 540 is heated by heat exchanger 517 and passed through connection 541 to membrane reactor 505. In membrane reactor 505 a second stage permeate stream 553 and a second stage retentate stream 542 are isolated. The light sulfur species are isolated into the vapor phase permeate stream 553 due to the sulfur selectivity of the membrane. This vapor stream is condensed in heat exchanger 518 and pumped back into the tank 501 by pump 519.

The auxiliary fuel stream is the retentate stream 542. Based on the performance of second stage reactor 505, a polishing filter 506 may or may not be needed. The low sulfur fuel stream is then passed via connection 543 to the auxiliary storage tank 502.

Figure 14:
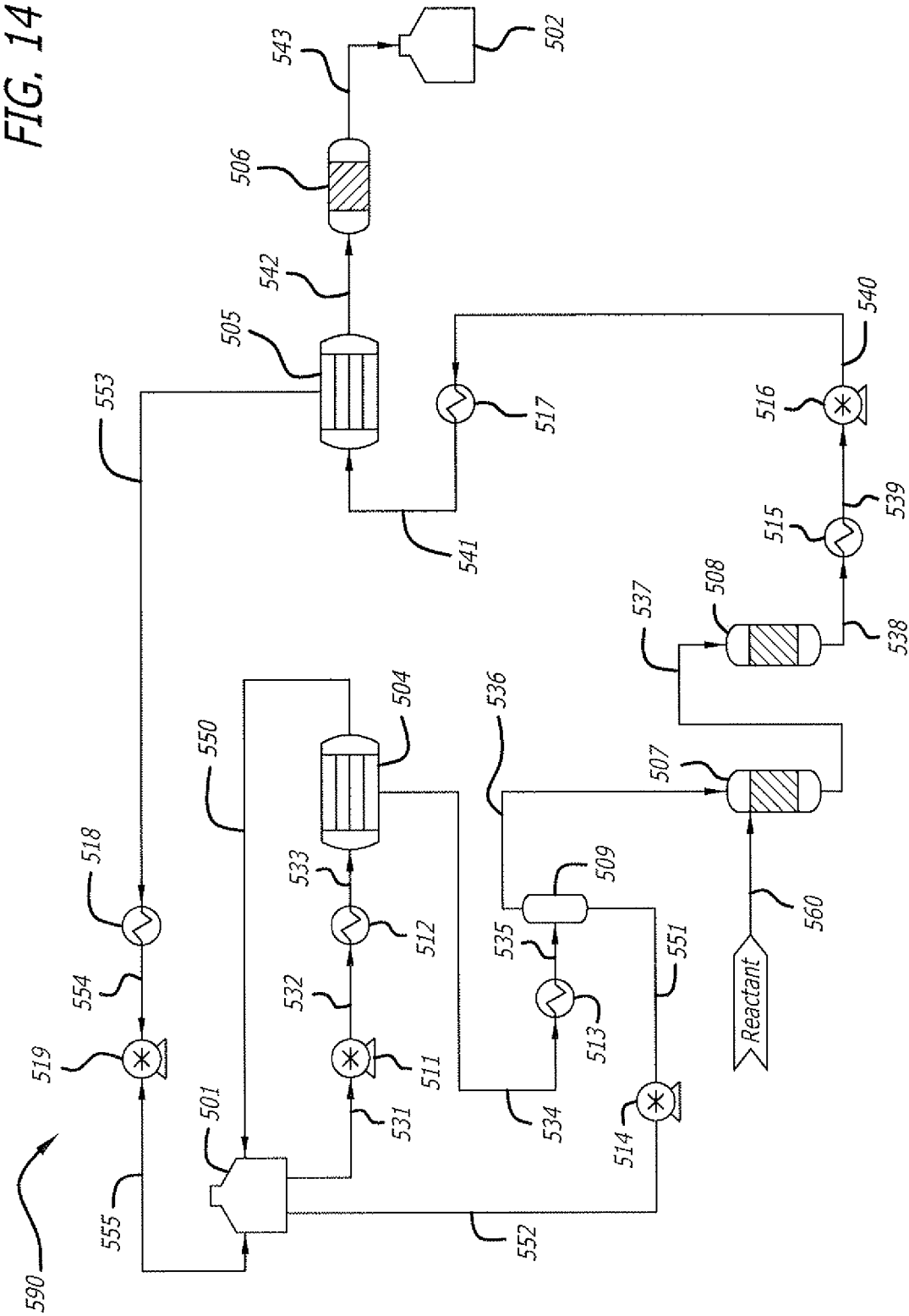
FIG. 14 is a schematic flow diagram of another exemplary system illustrative of an alternative system as in FIG. 9.

Another embodiment of the processing system 590 is illustrated in FIG. 14. In this embodiment 590 both the partial condenser 513/separator 509 and the second stage membrane reactor 505 are included. A separate discussion of this embodiment 590 is not believed to be necessary, as the features of this embodiment are simply combined from those of embodiments shown in FIGS. 11-13.

Validation of the configuration presented in FIG. 11 was conducted and the tested data is presented in Table F below. Two runs (18788-52A and 18788-52B) were conducted with reactant 560 being hydrogen for a hydro-desulfurization process and the catalyst 507 was a commercial NiMo type. One test (921-3-4) was conducted with reactant 560 being oxygen (air) for a oxidative desulfurization process and the catalysts 507 was a proprietary noble metal type catalyst. During all three tests the sorbent bed 508 was a high surface area activated carbon type bed. The data presented represents the concentration of sulfur species in stream 539 after condensation. The data clearly indicates the sulfur reduction capability of the embodiment defined in FIG. 11 with sulfur concentrations under 15 ppm for test run 18788-52A.

TABLE F

Test Data results from three runs with RDS and Partial condenser (FIG. 11)

| | Test run 18788-52A | Test run 18788-52B | Test run 921-3-4 |
|---|---|---|---|
| Sulfur Species Configuration | M1 lights with HDS | M1 lights with HDS | M1 Lights with ODS |
| Mercaptans | 0 | 0 | 0 |
| Thiophene | 0 | 0 | 0 |
| MethylThiophenes | 0 | 0 | 0 |
| TetrahydroThiophene | 0 | 0 | 0 |
| C2-Thiophenes | 0.1 | 0.4 | 6.4 |
| C3-Thiophenes | 1.2 | 3.6 | 31.0 |
| C4-Thiophenes | 3.4 | 7.8 | 27.3 |
| Thiophenol | 0 | 0 | 0 |
| MethylThiophenol | 0 | 0 | 0 |
| BenzoThiophene | 0 | 0 | 0 |
| C1-Benzothiophenes | 1.5 | 2.7 | 0.3 |
| C2-Benzothiophenes | 2.6 | 6.5 | 0.0 |
| C3-Benzothiophenes | | | |
| C4+-Benzothiophenes | | | |
| Dibenzothiophenes | 0.0 | 0.5 | 0.0 |
| Total S, ppm by wt (AED) | 8.7 | 21.5 | 73.2 |
| Total S, ppm by wt (XRF) | 12.1 | 30.1 | 90.0 |

Figure 15:
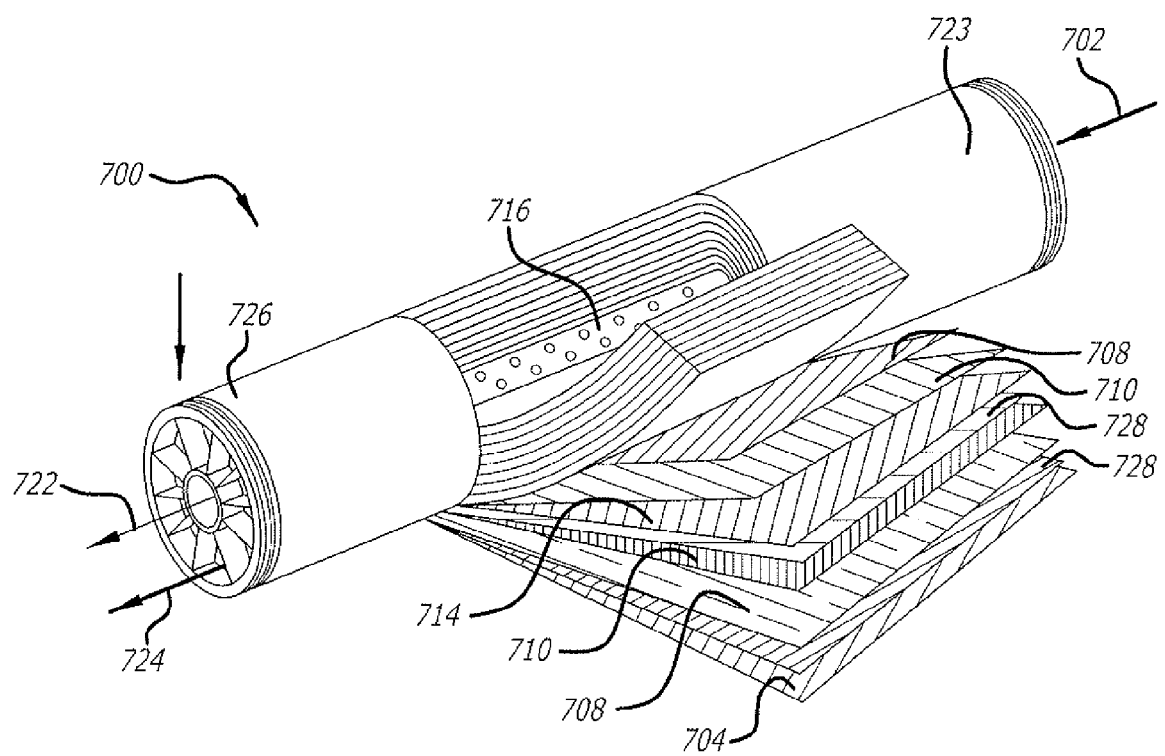
FIG. 15 is a partially exploded view of a spiral module with integral heating.
Figure 16:
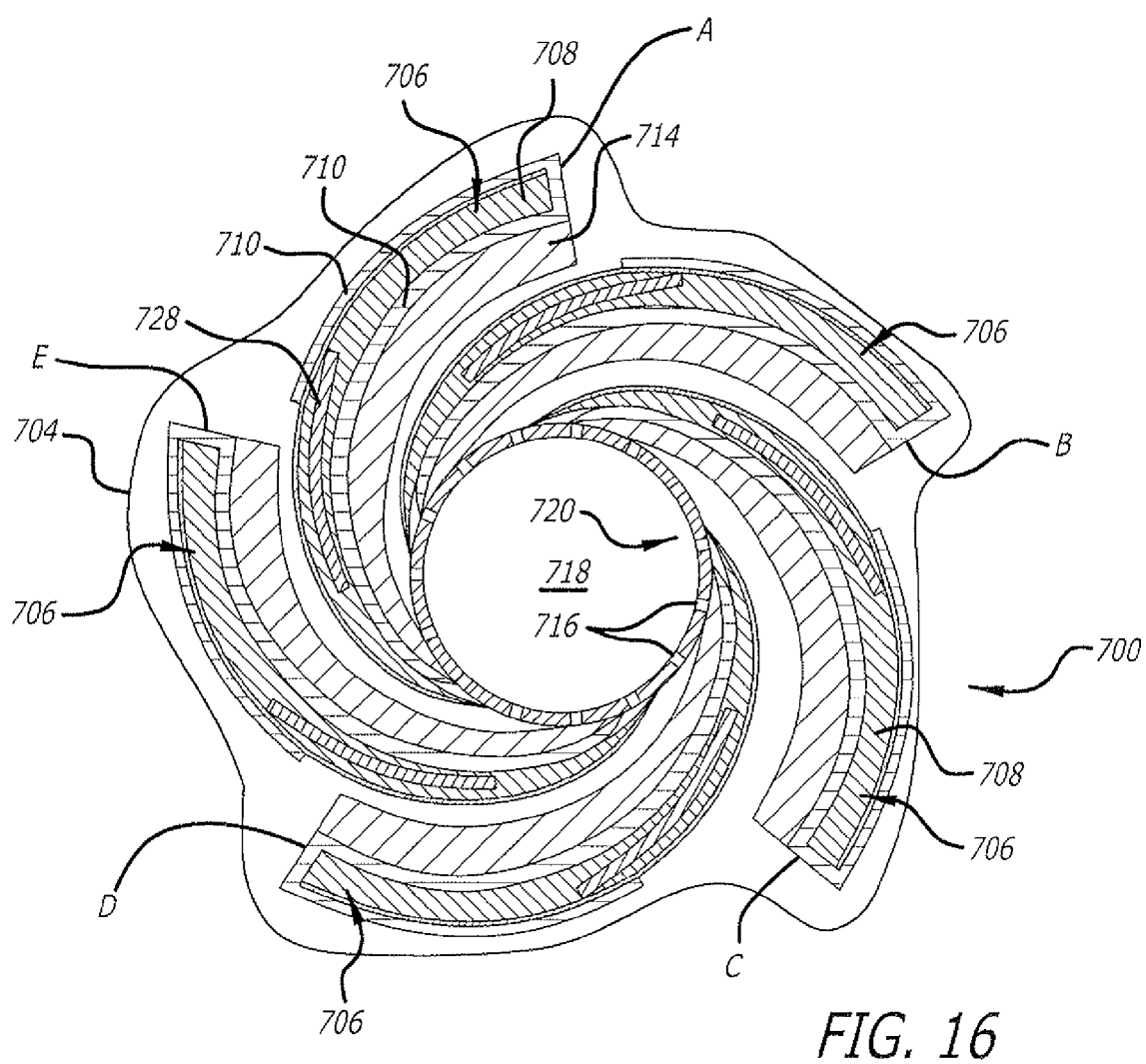
FIG. 16 is a cutaway along line A-A of FIG. 15.

Shown in FIG. 2 is a stage-two feed 42 passed to re-heat heat exchanger 51 to maintain and provide a hot stage-two feed 421 that enters a stage-two separator 41. If the re-heat heat exchanger were to be eliminated or reduced in size and/or capacity the feed stream would cool and the hot functioning stage-two separator 41 would nor work efficiently, or at all, depending on the nominal temperature the membrane operates at. In the exemplary implementation shown in FIGS. 15 and 16 a modules assembly 700 such as a stage-two separator is shown. The module assembly has a spiral configuration which is tightly packed as compared to a planar module (which is a different geometry module assembly which also may be used for stage-two separation see FIG. 17).

The module assembly 700 function is described in reference to the stage-two separator described in other exemplary implementation. A fuel feed 702 (such as a hot stage-two feed) enters one end of the module assembly 700. The module outer covering 704 is a leak resistant casing with adequate strength and heat resistance to contain hot feed and resist a vacuum the covering and internal elements may also be referred to as a module or a body. Inside the module 700 the fuel 702 passes through feed channels 706 with spacers 708. The spacers 708 may comprise a wire mesh, or other porous flexible materials are within the feed channel. A membrane 710, which may be a separate layer or formed as part of a side of the feed channel 706 provide communication between the feed channel 706 and a vacuum collection channel 718. Collection channel spacers 714 which may comprise a wire mesh, or other porous flexible materials are within the vacuum collection channel. The vacuum collection channels are positioned around a perforated tube 716 whereby a vacuum is drawn in the vacuum collection channel 718 and the perforations 720 communicate with the exterior of the perforated tube 716. The perforated tube 716 usually made of stainless steel, is where permeate 722 is withdrawn under vacuum after having diffused through the membranes 710.

Those of ordinary skill in the art will recognize that a scavenging gas may be used to assist in the evacuation of permeate vapor. In use, a feed solution enters the module assembly 700 at an input end 723 and the concentrate (or retentate) 724 which is the depleted feed solution exits the output end of the module 726 (see generally FIG. 2). One or more heating elements 728 are also wrapped into the spiraled module 700 during its construction. The heating elements 728 are an integral part of the module assembly. The internal heat provided by the heating elements 728 can increase or maintain temperature of the hot feed across the length of the module. The diffusion across the membrane of the permeate is a temperature dependant process. The addition of heat, from the heating element, inside the module can increase efficiency of the separation. A variety of temperature sensing elements (RTD, thermocouple, etc.) can be inserted into the module and used in a PID feedback type control strategy to modulate the power input to the heating element. The monitoring may take place with the portion of the module (which may be a chamber or layer) through which the feed passes.

The diffusion across the separation membrane is temperature dependant the measurement of heat at, on, or proximal to the membrane is also disclosed. A self-limiting energy input strategy such as using a positive temperature coefficient resistive material may also be applied to control the heat added.

Figure 17:
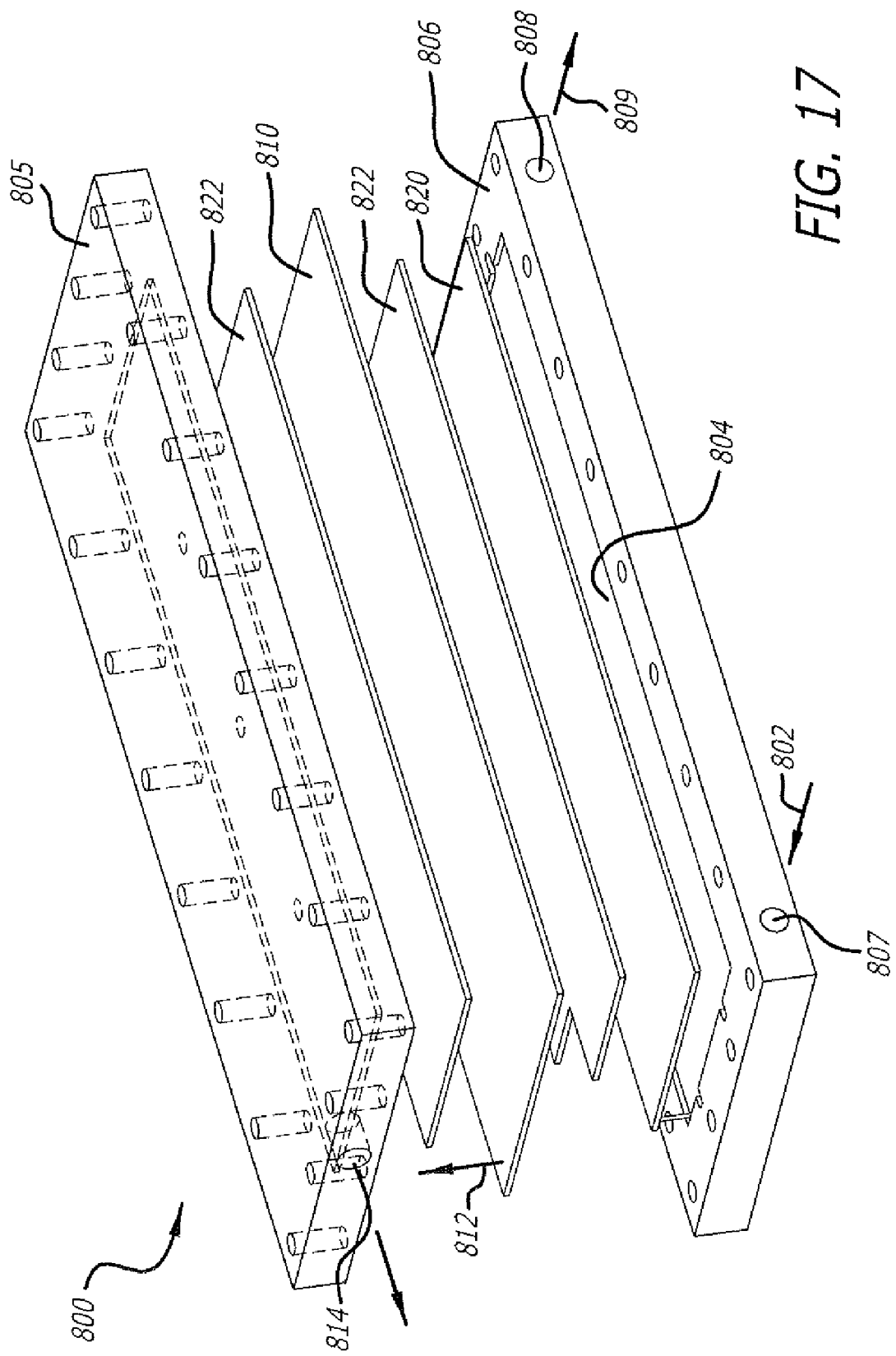
FIG. 17 is an assembly view a module with integral heating.

Illustrated in FIG. 17 is a plate and frame membrane module assembly 800 the hot feed flow 802 enters a chamber 804, formed between a top plate 805 and a bottom plate 806 (form a casing), through an inlet 807 of the membrane module assembly 800. An outlet 808 at the perimeter of the module assembly provides an exit for the depleted feed solution 809. Inside the chamber 804 the membrane 810 directs the permeate 812 into one pathway for collection visa vie a vacuum outlet 814 and the retentate exits as depleted fuel 809 through the outlet 808.

The exemplary implementation shown in FIG. 17, also has one or more heating elements 820 integrated within the module 800. Types of useful heating elements for an integrated configuration series or parallel include heating blankets, resistance heating such as a Kapton heater, manufactured by Omega Engineering (www.Omega.com), radio frequency (RF) and fluid filled cavities, such as those manufactured by Watlow, Tempco. One or more spacers 822 are sequenced to provide separation for feed flow between the heating element(s) 820 and the membrane 810 as well as between the membrane 810 and the top of the chamber 802 in the top plate 805. Alterations, changes, and additions may be made in the above systems and processes without departing from the scope of the disclosure herein involved. It is therefore intended that all matter contained in the above description, and as shown in the accompanying drawing, shall be interpreted as illustrative, and exemplary. It is not intended that the disclosure be limited to the illustrated embodiments.

While the apparatus and method have been described in terms of what are presently considered to be the most practical and preferred embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A method for adding heat to a feed liquid within a heat efficient spiral prevaporation module, said method comprising;
   integrating at least one heating element within wound membrane layers of said spiral prevaporation module;
   passing a liquid feed into said spiral prevaporation module on one side of at least one of said wound membrane layers;
   adding a quantity of heat produced by the integrated heating element to the feed liquid as it passes through said spiral prevaporation module; and
   separating permeate from retentate by passing the permeate through the membrane within said spiral prevaporation module.

2. The method of claim 1, wherein the heating element is selected from the group consisting of an electrical heat blanket, a liquid heating media hollow foil, an electrically inductively driven electrical conduit and a radio frequency driven electrical conduit.

3. The method of claim 1, wherein the heat within the module is measured during use and that measurement is used, at least in part, to adjust the quantity of heat provided by the heating element over time.

4. The method of claim 1, wherein the heat of the feed liquid within the module is measured during use and that measurement is used, at least in part, to adjust the quantity of heat supplied to the feed liquid, by the heating element, over time.

5. The method of claim 1, the method further comprising applying a vacuum to the module whereby the vacuum assists the with the removal of permeate from the module.

6. A heat efficient spiral prevaporation module comprising:
   a casing;
   a chamber formed with the casing;
   layered material including at least a membrane and a heating element within the casing;
   whereby the membrane selectively separates out a permeate from a feed fuel stream and the heating element adds heat to at least one of the feed fuel and the membrane;
   a means to introduce feed fuel to one side of the membrane;
   a means to remove depleted feed fuel which did not cross the membrane; and
   a means to remove the permeate which crossed through the membrane.

7. The device of claim 6, wherein the means to introduce feed fuel is an inlet line and the means to remove depleted fuel is an outlet line.

8. The device of claim 6, wherein the means to remove the subset of the feed fuel which crossed the membrane is a vacuum line out.

9. The device of claim 6, wherein the heating element is selected from the group consisting of an electrical heat blanket, a liquid heating media hollow foil, an electrically inductively driven electrical conduit and a radio frequency driven electrical conduit.

10. An heat efficient spiral prevaporation module comprising:
    a casing;
    a chamber formed with the casing;
    wound layers of material including at least one membrane and at least one heating element within the casing;
    whereby the membrane selectively separates a subset of a feed fuel stream and the heating element adds heat to the feed fuel and membrane;
    an inlet to introduce feed fuel to one side of the membrane;
    an outlet to remove depleted feed fuel which did not cross the membrane; and
    an permeate collection outlet to remove the permeate which crossed through the membrane.

11. The device of claim 10, wherein the heating element is selected from the group consisting of an electrical heat blanket, a liquid heating media hollow foil, an electrically inductively driven electrical conduit and a radio frequency driven electrical conduit.

12. A method for adding heat to a feed liquid within a layered spiral prevaporation module, said method comprising;
    fixing at least one heating element within at least one membrane in said spiral prevaporation module through which feed liquid flows during use;
    selectively controlling the heat produced by said heating element; and
    adding a quantity of heat produced by said heating element to the feed liquid.

13. The method of claim 12, wherein the heat within the module is measured during use and that measurement is used, at least in part, to adjust the quantity of heat supplied over time by the heating element.

14. The method of claim 12, wherein the heat of the feed liquid within the module is measured during use and that measurement is used, at least in part, to adjust the quantity of heat supplied to the feed liquid, by the heating element, over time.

* * * * *